(12) United States Patent
Kai et al.

(10) Patent No.: US 8,085,411 B2
(45) Date of Patent: Dec. 27, 2011

(54) DATA PROCESSING APPARATUS, PRINT CONTROL METHOD, COMPUTER-READABLE STORAGE MEDIUM, AND PROGRAM STORED THEREIN

(75) Inventors: Hiroshi Kai, Tokyo (JP); Masakazu Nomoto, Kanagawa (JP); Tsuyoshi Yamamoto, Kanagawa (JP); Hideo Natori, Tokyo (JP); Hideki Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1273 days.

(21) Appl. No.: 10/910,285

(22) Filed: Aug. 4, 2004

(65) Prior Publication Data
US 2005/0030334 A1 Feb. 10, 2005

(30) Foreign Application Priority Data
Aug. 8, 2003 (JP) .................................. 2003-206826

(51) Int. Cl.
*G06K 15/00* (2006.01)
(52) U.S. Cl. ........................................ 358/1.12; 358/1.18
(58) Field of Classification Search ............ 358/1.1–1.9; 347/14
See application file for complete search history.

(56) References Cited

U.S. PATENT DOCUMENTS

| 6,587,971 | B1 | 7/2003 | Kai | 714/48 |
| 6,646,758 | B1* | 11/2003 | Anderson et al. | 358/1.15 |
| 6,967,730 | B2* | 11/2005 | Tomita | 358/1.13 |
| 2001/0026293 | A1* | 10/2001 | Kaneko | 347/14 |
| 2003/0058469 | A1* | 3/2003 | Buis et al. | 358/1.15 |
| 2003/0137679 | A1* | 7/2003 | Nakazawa et al. | 358/1.6 |

FOREIGN PATENT DOCUMENTS

| JP | 7-234767 | 9/1995 |
| JP | 11-316669 | 11/1999 |

* cited by examiner

*Primary Examiner* — Twyler Haskins
*Assistant Examiner* — Lennin Rodriguez
(74) *Attorney, Agent, or Firm* — Fitzpatrick, Cella, Harper & Scinto

(57) ABSTRACT

It is necessary to avoid performing printing which brings about a poor printing result due to a mismatch between a medium fed by a printer and a set medium. For arbitrary paper, a paper type determining process unit 612 determines according to the information plural times detected with different timing during the process on the print data whether or not a mismatch occurred between the type of paper set on a printer and paper set by a print setting process unit 611, and the generation and output of print data by a print data generating process unit 618 is correctly controlled.

25 Claims, 14 Drawing Sheets

| GROUP | GROUP OF PAPER | TYPE OF PAPER |
|---|---|---|
| GROUP 1 | PLAIN PAPER TYPE | PLAIN PAPER, RECYCLED PAPER |
| GROUP 2 | COATED PAPER TYPE | COATED PAPER, MAT PAPER |
| GROUP 3 | GLOSSY PAPER TYPE | GLOSSY PAPER, PHOTOGRAPHIC PAPER, HIGH-QUALITY PHOTOGRAPHIC PAPER |
| GROUP 4 | OHP FILM TYPE | OHP FILM |

| GROUP | PRINT PROFILE |
|---|---|
| GROUP 1 | PROFILE FOR PAPER OF PLAIN PAPER TYPE |
| GROUP 2 | PROFILE FOR PAPER OF COATED PAPER TYPE |
| GROUP 3 | PROFILE FOR PAPER OF GLOSSY PAPER TYPE |
| GROUP 4 | PROFILE FOR PAPER OF OHP FILM TYPE |

FIG. 7

| GROUP OR PAPER | POSSIBILITY OF FRAMELESS PRINTING |
|---|---|
| GROUP 1 | POSSIBLE |
| GROUP 2 | PARTIALLY POSSIBLE |
| GROUP 3 | POSSIBLE |
| GROUP 4 | NOT POSSIBLE |
| PLAIN PAPER | POSSIBLE |
| RECYCLED PAPER | POSSIBLE |
| COATED PAPER | NOT POSSIBLE |
| MAT PAPER | POSSIBLE |
| GLOSSY PAPER | POSSIBLE |
| PHOTOGRAPHIC PAPER | POSSIBLE |
| HIGH-QUALITY PHOTOGRAPHIC PAPER | POSSIBLE |
| OHP FILM | NOT POSSIBLE |

FIG. 8

| GROUP OR PAPER | POSSIBILITY OF DOUBLE-SIDED PRINTING |
|---|---|
| GROUP 1 | POSSIBLE |
| GROUP 2 | NOT POSSIBLE |
| GROUP 3 | NOT POSSIBLE |
| GROUP 4 | NOT POSSIBLE |
| PLAIN PAPER | POSSIBLE |
| RECYCLED PAPER | POSSIBLE |
| COATED PAPER | NOT POSSIBLE |
| MAT PAPER | NOT POSSIBLE |
| GLOSSY PAPER | NOT POSSIBLE |
| PHOTOGRAPHIC PAPER | NOT POSSIBLE |
| HIGH-QUALITY PHOTOGRAPHIC PAPER | NOT POSSIBLE |
| OHP FILM | NOT POSSIBLE |

FIG. 9

PAPER SET COMMAND

| 1Bh | ! | 'm' | 00h | 05h | '1' | '2' |

FIG. 10

FRAMELESS PRINTING SET COMMAND

| 1Bh | ! | 'b' | 00h | 03h | '1' |

FIG. 11

DOUBLE-SIDED PRINTING SET COMMAND

| 1Bh | ! | 'd' | 00h | 03h | '1' |

FIG. 12

XXX xxxx

PAPER SET ON THE PRINTER DOES NOT MATCH THE PAPER DESIGNATED BY PRINT DATA.
IF PRINTING IS TO BE CONTINUED, CLICK "CONTINUE PRINTING."
IF PRINTING IS TO BE STOPPED, CLICK "STOP PRINTING."

[CONTINUE PRINTING.] [STOP PRINTING.]

PRINTING WARNING DIALOG (1)

PRINTING WARNING DIALOG (2)

FIG. 21

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEP<br>OF FLOWCHART SHOWN IN FIG. 13 |
| SECOND DATA PROCESSING PROGRAM<br>PROGRAM CODE GROUP CORRESPONDING TO STEP<br>OF FLOWCHART SHOWN IN FIG. 14 |
| THIRD DATA PROCESSING PROGRAM<br>PROGRAM CODE GROUP CORRESPONDING TO STEP<br>OF FLOWCHART SHOWN IN FIG. 15 |
| FOURTH DATA PROCESSING PROGRAM<br>PROGRAM CODE GROUP CORRESPONDING TO STEP<br>OF FLOWCHART SHOWN IN FIG. 19 |
| FIFTH DATA PROCESSING PROGRAM<br>PROGRAM CODE GROUP CORRESPONDING TO STEP<br>OF FLOWCHART SHOWN IN FIG. 20 |
| |

MEMORY MAP OF STORAGE MEDIUM

DATA PROCESSING APPARATUS, PRINT CONTROL METHOD, COMPUTER-READABLE STORAGE MEDIUM, AND PROGRAM STORED THEREIN

BACKGROUND OF THE INVENTION

1. Field of the Invention

The present invention relates to a data processing apparatus and a print control method capable of acquiring the information about the type of record medium (paper) which is mounted in a printer and on which data is to be printed, automatically determining the type of paper, and automatically determining the print mode appropriate for the paper, a computer-readable storage medium storing a program, and a program itself.

2. Related Background Art

Conventionally, a printing system is normally configured by a color printer capable of performing color output, a host computer for controlling the printer and generating print data, and a communications interface connecting them. In color printers, an ink jet printer can use various types of paper depending on each use. Paper of various materials is available. For example, plain paper for use in a copying machine, coated paper which is coated with silica, etc. for resisting smearing of ink and obtaining good coloring, glossy paper for use in forming a photographic image like a silver halid photo, an OHP film for a transparent original, a transfer paper for iron printing, a backprint film, etc. are available.

When the above-mentioned paper (medium) is printed, a user selects the type of record medium (paper) to be printed on in the settings for printing on the printer driver, and appropriate printing is performed based on the settings.

Recently, a printer load with a sensor called a media sensor for automatically determining the type of paper has been developed. Refer to Japanese Patent Application Laid-Open No. H11-316669 and Japanese Patent Application Laid-Open No. H07-234767.

For example, Japanese Patent Application Laid-Open No. H11-316669 discloses the technology of detecting the type (type of paper) of printing paper set on the printer, determining whether or not it matches the user-designated type of paper, and, if they do not match, amending by a color conversion process unit the color information contained in the print data to the color information corresponding to the set type of printing paper, and transferring the result to the printer. Thus, the technology of checking whether or not the user-set type of paper is correct, and issuing a warning, etc. has been a conventional technology.

However, the above-mentioned conventional technology has the following problems.

(1) The contents disclosed by the conventional technology are allowing a user to determine the type of paper from among various types of paper, and input the determined type of paper, and checking the input setting. Therefore, although it is determined whether or not the type of paper is appropriate for the print processing, the user has to perform a laborious operation.

In the actual printing operation, it is assumed that there are a number of users who performs printing with the default without specifically changing the type of paper, and it is desired to realize print processing appropriate for the type of medium set on the printer without forcing a user to perform a laborious operation.

(2) To determine the type of paper when a printing operation is performed, for example, in a network environment, another user can newly set a different type of paper before the printer starts, feeding paper. Therefore, if such a case practically occurs, then the correspondence between print data and paper is inconsistent, and a print result appropriate for paper cannot be obtained, and furthermore paper and ink are wasted.

(3) According to the conventional technology, for example, when a print job of 10 pages and another print job of 5 pages are to be performed, the subsequent print job of 5 pages is to be held until the preceding print job of 10 pages is completed so that the user can avoid the above-mentioned problems although the user issues print instructions to the respective print jobs. That is, the subsequent print job can be performed only after the preceding print job is completed, and the type of paper actually used in the subsequent job can be detected.

In this method, each print processing has to be started only after the preceding printing operation is completed, and the application software for performing a printing operation cannot terminate the print processing. Thus, the operability of the computer of the user is degraded. Furthermore, since a plurality of print jobs cannot be concurrently performed, the efficient of print processing is lowered.

Additionally, for example, the frameless printing in which printing is performed on the entire page without margin, the double-sided printing in which a printing process is performed on both sides of paper, etc. are not permitted for some types of paper. However, in the printing system using the above-mentioned media sensor, an undesired combination between a medium and the characteristic of image information is determined. There has not been the idea of determining the applicability of a medium based on the frameless printing and double-sided printing, and the type of medium.

SUMMARY OF THE INVENTION

Accordingly, the present invention is conceived as a response to the above-described disadvantages of the conventional art.

The present invention aims at providing: a data processing apparatus and a print control method, capable of freely setting a useful print processing environment for avoiding printing which brings about a poor print result as a result of a mismatch of media between an actually fed medium and a set medium by restricting generation and output of print data with timing of a problem of a mismatch of the types of medium detected when print data is output although the types match before generating print data by determining through plural times of detecting during processing print data whether or not a mismatch occurs between the type of paper set on a printer and the paper set in the print mode; a computer-readable storage medium storing a program; and the program itself.

The present invention further aims at providing: a data processing apparatus and a print control method, capable of freely setting a useful print processing environment for avoiding printing which brings about a poor print result as a result of frameless printing and double-sided printing due to a mismatch of media between an actually fed medium and a set medium; a computer-readable storage medium storing a program; and the program itself.

According to one aspect of the present invention, preferably, a data processing apparatus includes: generation means for generating print data; output means for outputting print data generated by the generation means; detection means for detecting a mismatch according to first medium information acquired from the print data with first timing when print data is generated, and second medium information acquired with second timing before outputting the print data generated by the generation means; and processing means for performing processing based on the detection by the detection means.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 7 is a frameless printing support paper table managed by the special printing support paper table shown in FIG. 2;

FIG. 8 is a double-sided printing support paper table managed by the special printing support paper table shown in FIG. 2;

FIG. 9 shows the data format of a paper setting command contained in the head portion of the print data generated by the print data generation process unit shown in FIG. 2;

FIG. 10 shows the data format of a frameless printing setting command contained in the head portion of the print data generated by the print data generation process unit shown in FIG. 2;

FIG. 11 shows the data format of a double-sided printing setting command contained in the head portion of the print data generated by the print data generation process unit shown in FIG. 2;

FIG. 12 shows an example of a warning dialog (UI) displayed on the setting information notification unit shown in FIG. 1;

FIG. 21 is an explanatory view of a memory map of a storage medium storing various data processing programs readable by the data processing apparatus according to the present invention.

DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
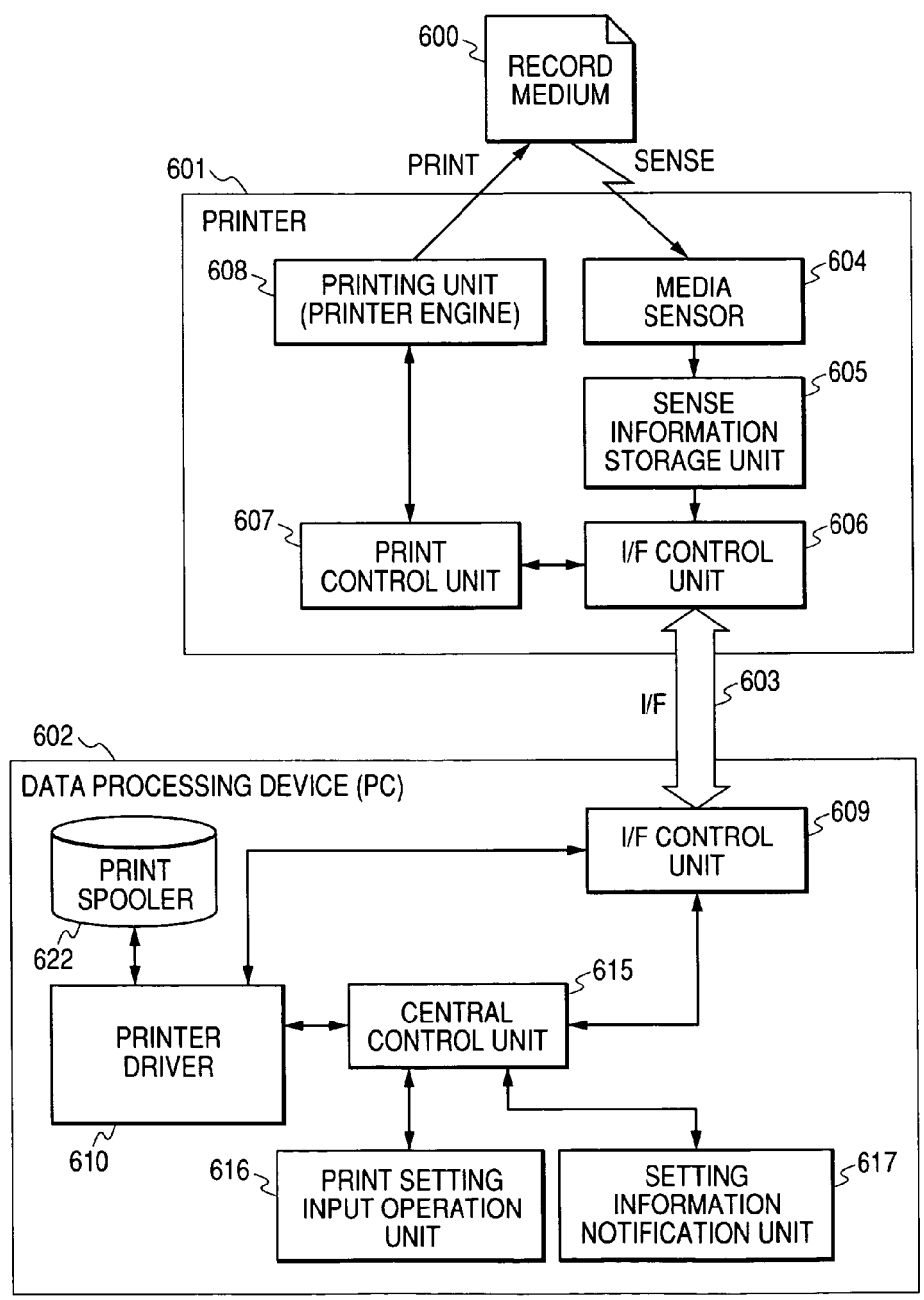
FIG. 1 is a block diagram of a printing system to which the data processing apparatus according to the first embodiment of the present invention.

FIG. 1 is a block diagram showing the configuration of the printing system to which the data processing apparatus according to the first embodiment of the present invention can be applied.

In FIG. 1, a color printer 601 (printer) forms an image in an ink jet system based on the print data generated by a PC 602 described later.

In the present embodiment, the type of printer is not specified, but a color printer in the ink jet system is assumed in this example.

The printer 601 is configured by various function blocks 604 to 608.

In FIG. 1, the data processing apparatus (PC) 602 generates print data and controls the connected printer 601, and a personal computer (hereinafter referred to as a PC for short) is assumed in this example. The PC 602 also has the function of receiving an instruction and input from a user relating to the settings of printing.

The PC 602 is configured by various function blocks 609, 610, 615 to 617, and 622. Furthermore, although not shown in FIG. 1, an operating system for controlling the PC 602 is incorporated, and various function blocks are operated on the operating system. A communications interface 603 connects the PC 602 to the printer 601. In this embodiment, a serial interface USB (Universal Serial Bus) is assumed. In addition, IEEE1394, Ethernet (registered trademark), IrDA (registered trademark), IEEE802.11, power line, etc., and a plurality of types such as a parallel interface of Centronics, SCSI, a local area network interface in compliance with Ethernet communication system, etc. can be assumed, but any interface can be used regardless of cable or radio so far as it can realize bi-directional communications. Thus, a printing system according to the present embodiment is not a simple apparatus, but the PC 602 and the printer 601 for forming an image are connected through a specific bi-directional interface. However, the system is not limited to this example, but can be a printing system in which the functions of the PC and the printer are incorporated. The functions of the printer 601 and the PC 602 which are not necessary in explaining the features of the present embodiment are omitted here.

A paper recognition sensor (media sensor) 604 obtains the information for designation of the type and the size of a record medium 600. The record medium 600 is assumed to be loaded to the paper feed tray, a cassette, etc. provided for the printer 601.

As means for grasping the feature amount for determination of the type of paper can be means for marking paper which is a record medium in advance, and optically detecting the mark, means for using a dedicated paper cassette, means for incorporating an IC chip into paper, means for optically detecting reflected light (regularly reflected light and diffusion-reflected light) of specific light emitted to paper, means for directly or indirectly measuring the coarseness of a surface, means for measuring the transmittance of light, etc. In addition, there are a number of realization means such as means for determining the weight, thickness, a friction coefficient, permittivity, an electric resistance, a water absorption rate, etc., means for capturing a two-dimensional image and making determination based on a feature amount.

These detection means realizes a paper recognition function as a single unit or as a combination of a plurality of units. In the present embodiment, the principle or the configuration of a media sensor is not specified, but at least a function of determining the type of paper is to be included.

According to the present embodiment, for example, a printer loaded with a media sensor is to be implemented to a product at a relatively low cost, has paper recognition accuracy which is not so high, and does not have precision of correctly recognizing all paper selectable by a paper type selection unit 502 in the paper of a print setting dialog 501 as described later by referring to FIG. 6.

A sense information storage unit 605 stores information (feature amount) about the paper recognized by the media sensor 604. The sense information can be stored with a history. An I/F control unit 606 controls the interface function of the printer 601. Since an assumed interface is an USB in this example, it is assumed that the unit is configured by a controller on the peripheral unit side of the USB. The I/F control unit 606 transmits paper information and receives print data, a control command, etc.

If there is a request about the status information such as an error occurring in the body of a printer, a communications status, etc., control of returning it to the PC 602 is also performed.

A print control unit 607 receives print data transmitted from the PC 602, and develops it to a printer engine. The print data transmitted from the PC 602 is a result of the image processing on the PC 602 side based on the print setting including the type and size of paper, etc. In this example, the printer engine is controlled according to the command for print control included in the print data.

Practically, the data configured by various commands for controlling the binary data for printing (intermediate data before binarization), the amount of implanted ink, the number of paths, the printing direction, and the amount of transfer of paper is used.

A printing unit (printer engine) 608 performs printing on the record medium 600 based on the print data developed by the print control unit 607. Since the printer 601 is a printer in the ink jet system, an image is formed by injecting the ink. An I/F control unit 609 controls the interface function of the PC 602.

It is configured by the controller on the host side of the USB, thereby having the function as a USB host. A part of the function as a USB host can also be configured by software such as an OS, a USB driver, etc.

A printer driver 610 is software for making settings for printing, generating print data, and controlling the printer on the PC 602. The printer driver 610 is described in detail later by referring to FIG. 2.

A central control unit 615 controls various functions of the PC 602, and the control corresponds to the function of the CPU. A print setting input operation unit 616 is configured by various input equipment for reflecting the intention of the user on the print settings. The setting information notification unit 617 notifies a user of print settings. A notification method can be used on the display device such as a monitor, etc. and by voice, etc.

The print control apparatus for performing a print data generating process is generally a personal computer, but some operating systems of personal computers cannot display a warning screen, etc. during the print data generating process. In this case, after performing the print data generating process, the print processing has to be suspended until the generated print data is transferred to the printer. In the environment in which a plurality of computers connected over a network share the printers connected to the respective computers, the print data is normally generated by a computer (client computer) which has performed an operation for printing, transferred over a network to a computer (server computer) to which a printer is connected, and further transferred from the server computer to the printer.

If a part of the computers configuring the above-mentioned network contains those which cannot display a warning screen, etc. during the print data generating process as described above, and the print data is generated as a client computer, it is necessary for a server computer, to which the print data generated by a client computer is transferred, to monitor the received print data and control the print data not to transfer the data to the printer so that print data not supported by detected paper cannot be transferred to the printer.

Figures 2, 3:
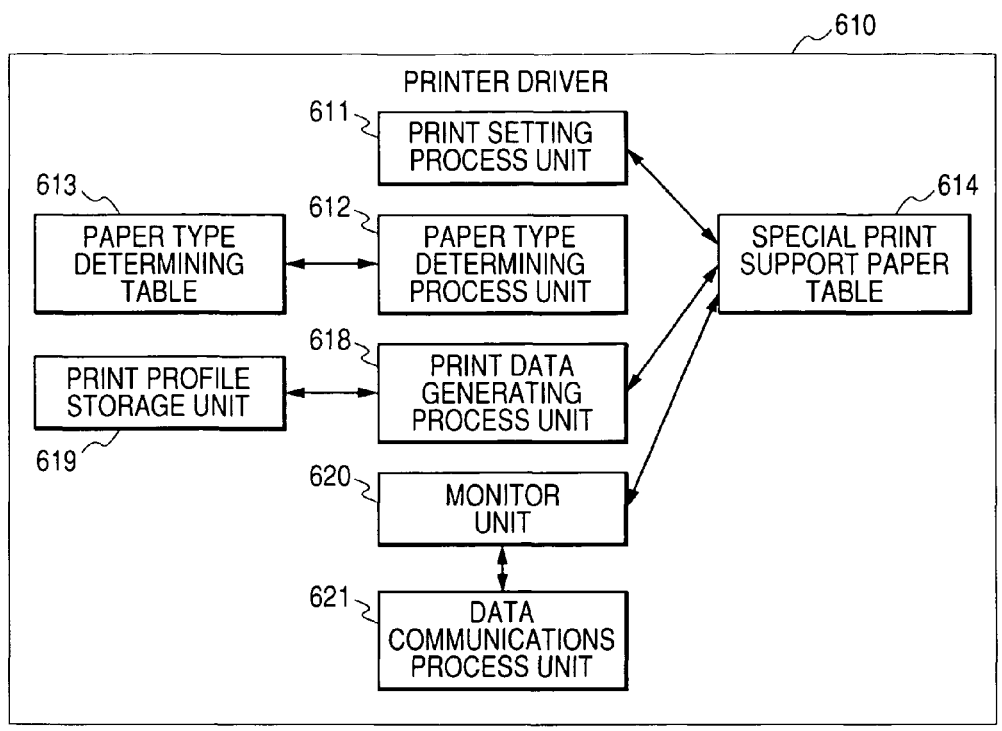
FIG. 2 is a block diagram showing the internal configuration of the printer driver shown in FIG. 1.
FIG. 3 shows the relationship between the group of paper which can be determined by the media sensor shown in FIG. 1 and the paper belonging to the group.

FIG. 2 is a block diagram showing the internal configuration of the printer driver 610 shown in FIG. 1.

In FIG. 2, a print setting process unit 611 makes various print settings including the setting of paper, print quality, etc. Upon receipt of an instruction and input from a user, the print setting process unit 611 has the functions of displaying and notifying the set contents. A paper type determining process unit 612 obtains an output result of the media sensor 604 through a communications line, and determines the type of paper based on the output result. In the present embodiment, the type of paper is determined using a reference table.

A paper type determining table 613 is referred to when paper is determined by the paper type determining process unit 612. The table is used when the paper type determining process unit 612 determines the type of paper.

A special print support paper table 614 stores information about a paper group and as to whether or not the paper supports frameless printing and double-sided printing. The information is configured such that it can be referred to from each of the print setting process unit 611, a print data generating process unit 618 described later, and a monitor unit 620 described later.

The print data generating process unit 618 generates a print job, generates print data according to a print profile stored in a print profile storage unit 619 and spool the print data to a print spooler 622 described later.

The print profile includes various types of information for control of the printing in the printer 601. The information can be, for example, available ink, the amount of implanted ink, the number of scanning paths of an ink jet printer head, resolution, quality, etc.

A monitor unit 620 transfers the print data stored in the print spooler 622 at an instruction of the print spooler 622 from a data communications process unit 621 described later to the printer 601 through the I/F control unit 609.

The monitor unit 620 analyzes the contents of print data before transferring the print data to a printer, obtains various print setting information such as paper information, also obtains status information such as sense information about the paper set in the printer 601 by the bi-directional communications with the printer 601, and controls the transfer of the print data to the printer 601 according to the obtained information.

The data communications process unit 621 performs a communications process with the printer 601 through the I/F control unit 609 at an instruction of the monitor unit 620. The communications process with the printer 601 is bi-directional, and comprises a process of transferring data such as print data, etc. to the printer 601, and a process of obtaining paper sense information and the status information about the printer such as a print processing progress, ink remainder information, etc. from the printer 601. The monitor unit 620 and the data communications process unit 621 can be included in the printer driver 610, or separately provided as associated with the printer driver 610.

The print spooler 622 sequentially stores the print data generated by the print data generating process unit 618, and transfers the stored print data to the printer 601. Since print data is asynchronously stored and transferred, the print data generating process can be efficiently performed without waiting for the print processing by the printer 601 although the print data generating process can be completed faster than the print processing by the printer 601. Generally, a print spooler is provided as a function of the operating system of a computer. For example, a print spooler of Windows (registered trademark) of Microsoft is provided.

FIG. 3 shows the relationship between the group of paper determined by the media sensor 604 shown in FIG. 1 and the paper contained in the group.

In FIG. 3, a group of each paper is described in a group column, and is classified into groups 1 to 4. A paper column indicates the names of the paper belonging to each group. The paper can be selected by paper type display/operation control 502 described later in FIG. 6.

For example, the group 3 is a paper group of glossy paper type and includes glossy paper, photographic paper, and high-quality photographic paper. Thus, plural types of paper are included in one group because, as described in FIG. 1, the paper recognition accuracy of the media sensor 604 is not so high, and, if plural types of paper are contained in a group, each of they cannot be correctly discriminated although the groups 1 to 4 can be correctly discriminated from one another (in group 1, recycled paper cannot be discriminated from plain paper, etc.).

The contents of the table are stored in the paper type determining table 613. The correspondence between a type of record medium detected by the media sensor 604 shown in FIG. 1 and each group is explained by referring to the determination map indicating the characteristics shown in FIG. 4.

Figure 4:
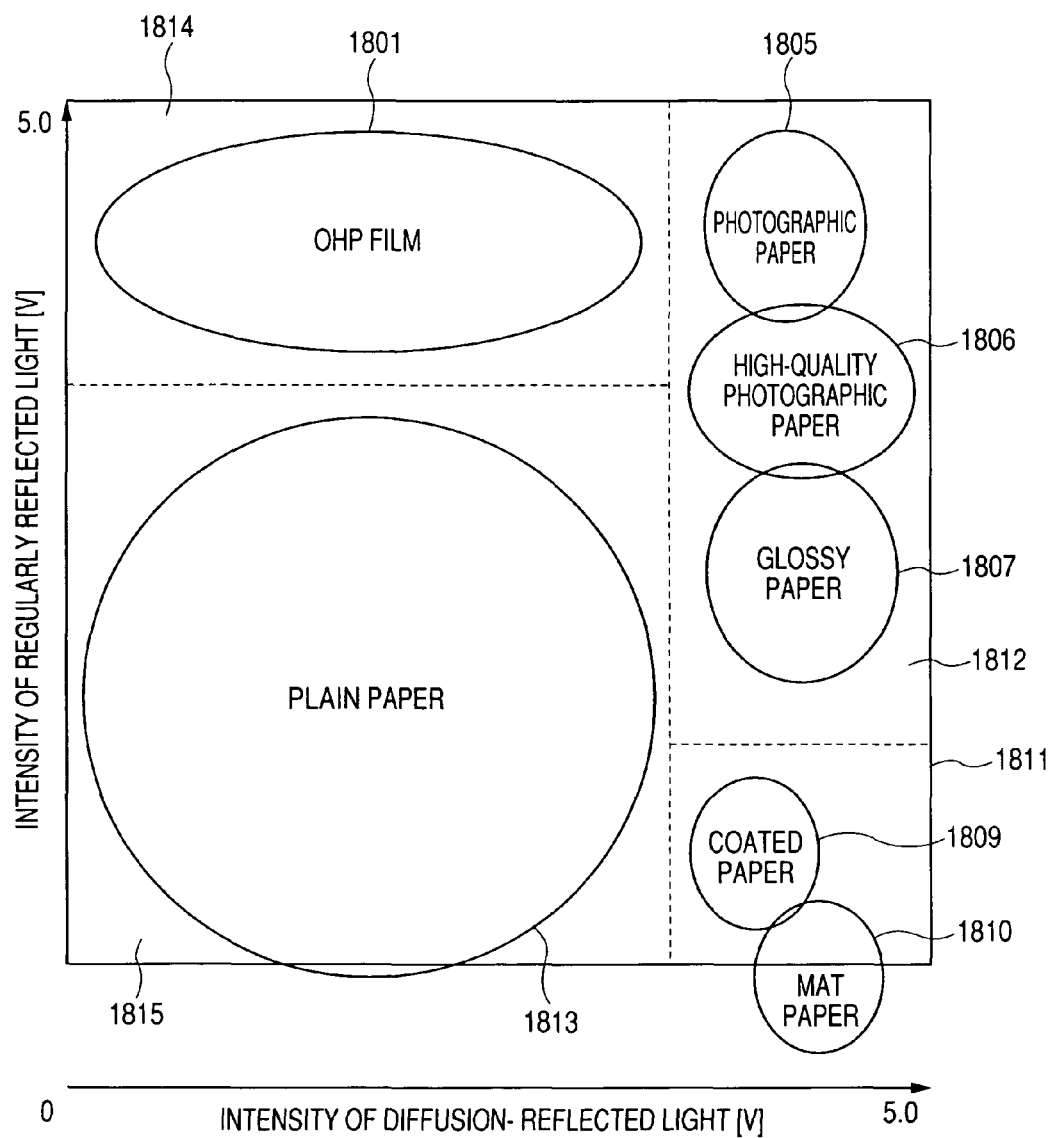
FIG. 4 is a determination map showing the relationship between the output of the media sensor shown in FIG. 1 and the type of paper.

FIG. 4 is a determination map indicating the relationship between the output of the media sensor 604 shown in FIG. 1 and the type of paper, and the type of paper is broadly classified into four types (rectangular area enclosed by the broken lined shown in FIG. 4). In FIG. 4, the vertical axis indicates the intensity of regularly reflected light (V), and the horizontal axis indicates the intensity of diffusion-reflected light (V).

As shown in FIG. 4, according to the present embodiment, light of an LED is emitted to the surface of the record medium 600, the reflected light (regularly reflected light and diffusion-reflected light) is collected by an optical sensor, and the intensity of the light is used in determination.

In FIG. 4, an OHP film type output range 1814 covers an output range of the actual reflected light when an OHP film 1801 is set as the record medium 600.

A glossy paper type output range 1812 covers the actual glossy paper type output range of the reflected light when photographic paper 1805, high-quality photographic paper 1806, and glossy paper 1807 are set as the record media 600.

A mat paper type output range 1811 covers the actual output range of the reflected light when part of coated paper 1809 and mat paper 1810 are set as the record media 600.

A plain paper type output range 1815 covers the actual output range of the reflected light when plain paper 1813 is set as the record medium 600 or when no paper is set.

The plain paper type output range 1815 corresponds to the group 1 shown in FIG. 3, that is, the plain paper group, and includes recycled paper.

The coated paper type output range 1811 corresponds to the group 2 shown in FIG. 3, that is, the coated paper group, and includes a part of mat paper.

The glossy paper type output range 1812 corresponds to the group 3 shown in FIG. 3, that is, the glossy paper group, and includes the photographic paper 1805, the high-quality photographic paper 1806, and the glossy paper 1807.

The OHP film type output range 1814 corresponds to the group 4 shown in FIG. 3, that is, the OHP film group.

Thus, for a simple and inexpensive configuration, the media sensor 604 shown in FIG. 1 can correctly identify and detect the difference between groups, but cannot individually determine a plurality of record media in the same group.

When a black seal is applied to a portion detected when no paper is determined, and no paper is set on a printer, the media sensor 604 shown in FIG. 1 obtains values close to 0 for the intensity of regularly reflected light and the intensity of diffusion-reflected light as sensor output values. In this case, an indication of no paper, for example, a group 0 is transmitted to the data processing apparatus 602, and can be displayed in the dialog before starting printing. Furthermore, the type of medium can be forcibly determined as plain paper.

When no paper is set, the print data generating process unit 618 sets plain paper frequently used or the default type of medium in a printer driver as set paper, reads the print profile for the type of the set paper from the print profile storage unit 619, and generates print data.

Figures 5, 6:
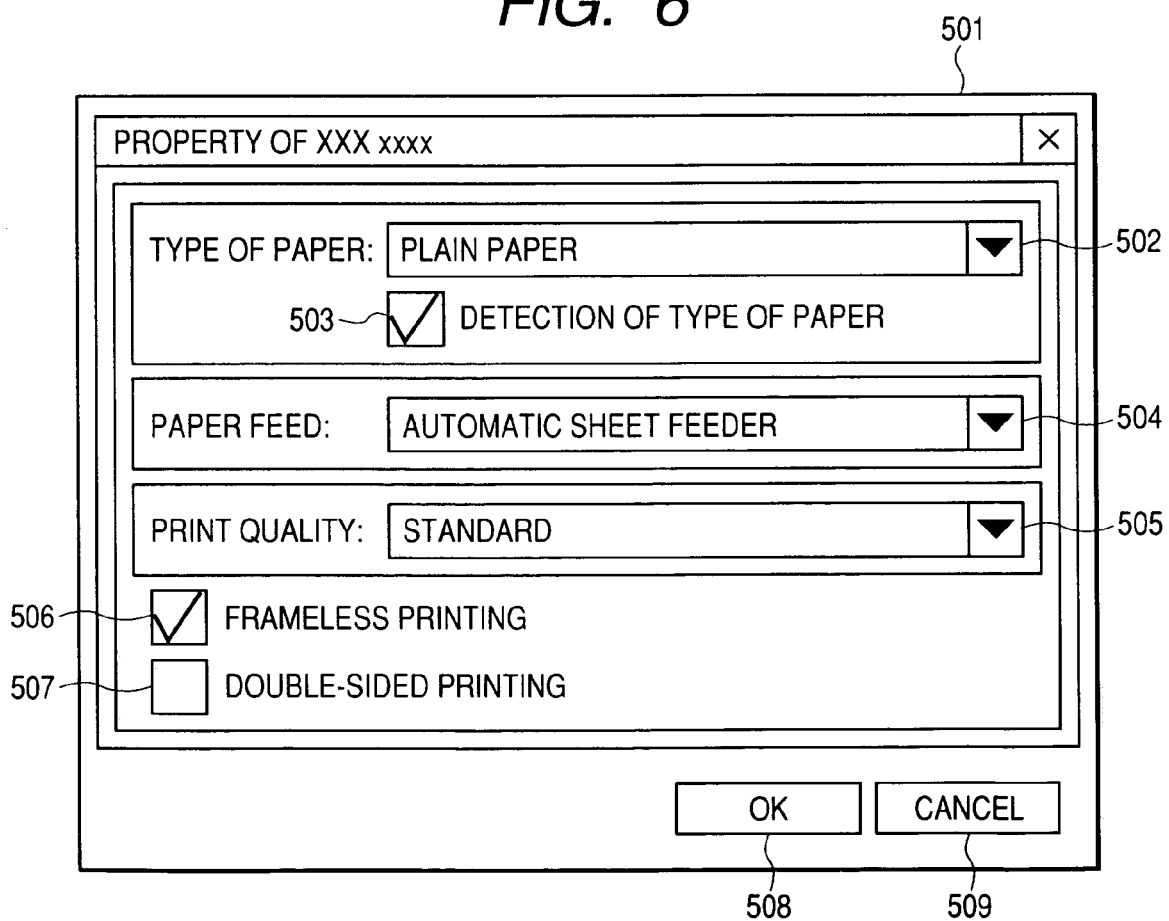
FIG. 5 shows the relationship between the group shown in FIG. 3 and an applicable print profile.
FIG. 6 shows an example of a print setting dialog displayed in a setting information notification unit of the data processing apparatus shown in FIG. 1.

FIG. 5 shows the relationship between the group shown in FIG. 3 and the applicable print profile. In FIG. 5, a print profile column indicates a profile for print processing such as color processing, image processing, etc. used during printing.

Group names shown in FIG. 3 are defined in the group columns, and the optimum print profile is defined for the type of each group.

For example, the optimum print profile for the group 3 is a profile for paper of glossy paper type, and the profile for paper of glossy paper type is tuned for the optimum print quality for each of the glossy paper, graphic paper, and high-quality graphic paper as the record medium 600. The contents of the table are stored in the print profile storage unit 619 shown in FIG. 2.

FIG. 6 shows an example of a print setting dialog displayed on the setting information notification unit 617 of the data processing apparatus 602 shown in FIG. 1, and corresponds to an example of a print setting dialog box displayed when a print mode and each type of paper is set according to the present embodiment.

In FIG. 6, the print setting dialog box can be displayed when a user performs a printing operation using application software, etc. for various settings in generating print data such as the type of paper, print quality, paper feeding method, frameless printing, double-sided printing, etc. The dialog box is displayed on the display device provided for the setting information notification unit 617 shown in FIG. 1.

In FIG. 6, a print setting dialog box 501 is configured by display areas 502 to 509. Paper type display/operation control 502 indicates the set type of paper for operation. The paper type display/operation control 502 has the choices of "plain paper, recycled paper, coated paper, mat paper, glossy paper, photographic paper, high-quality photographic paper, glossy film, and OHP film".

When a paper type detection check box 503 is not checked, print data is generated based on the profile corresponding to the type of paper selected here.

When the paper type detection check box 503 is checked, the paper type detecting function by the media sensor 604 shown in FIG. 1 is valid. When the paper type detecting function is valid, the type of paper is automatically detected when print data is generated, and the print processing appropriate for the detected type of paper can be performed.

According to the present embodiment, a check box is used to switch valid/invalid for the paper type detecting function, but any control other than the check box can be used to control the validity of the paper type detecting function by adding a choice of "automatic selection" to the above-mentioned paper type display/operation control.

Furthermore, control can be defined to make the paper type detecting function valid when a specific choice (for example, "plain paper") is selected from among the choices of the paper type display/operation control.

By canceling the check in the paper type detection check box 503, print processing can be performed with the optimum print setting forcibly used on the paper selected by the paper type display/operation control 502 functioning as the paper type selection unit regardless of the type of the record medium 600 set on the printer 601. However, in this case, when the paper selected by the paper type display/operation control 502 as the paper type selection unit is different from the record medium 600, exceedingly bad quality print result can be made.

Paper feeding method display/select control 504 selects an automatic sheet feeder or manual feed for the paper feed mode of the printer 601. Print quality display/select control 505 can display or select print quality. The setting of the print quality depends on the type of paper. The print quality has the choices of "high, standard, and quick".

When a frameless printing check box 506 is checked, the frameless printing function of generating print data can be valid such that printing can be performed on the entire page of paper without a margin. In the frameless printing, printing is performed from end to end in the vertical and horizontal directions. Therefore, depending on the type of paper, the paper can be considerably curled and can damage the internal mechanism of the printer.

Therefore, when the paper type display/operation control 502 selects the paper which does not support the frameless printing, the frameless printing check box is grayed out for rejection of a check.

However, when the above-mentioned paper type detection check box is checked, it is not certain which paper is used in printing until a printing operation is performed. Therefore, the frameless printing check box is not grayed out. When it is checked, the frameless printing function is valid in printing. FIG. 7 shows the support of each paper group or each paper for the frameless printing. The information is stored in the special printing support paper table explained by referring to FIG. 2. When a double-sided printing check box 507 is checked, the double-sided printing function of generating print data can be valid such that printing can be performed on both sides of paper.

Since both sides of paper is printed in the double-sided printing, for example, coated paper on the front of which is coated, etc. is used, the printing ink cannot be sufficiently absorbed by the back of the paper, thereby making a dirty inside of the printer. Therefore, when paper which does not support the double-sided printing is selected by the paper type display/operation control 502, the double-sided printing check box is grayed out for rejection of a check.

However, when the detection of the type of paper (a check is made in the paper type detection check box 503, and the setting of the paper type display/operation control 502 indicates default paper (plain paper)) is defined, it is not certain which paper is to be used until the printing operation is practically performed. Therefore, the double-sided printing check box is not grayed out, and the double-sided printing function is valid and the process is performed when it is checked.

FIG. 8 shows whether support of each paper group and each type of paper allow the double-sided printing, and the information is stored in the special printing support paper table described in FIG. 2.

When an OK button 508 is clicked, the print settings selected in the print setting dialog 501 are stored, and the print setting dialog 501 is closed. When a cancel button 509 is clicked, the print settings selected in the print setting dialog 501 are returned to the status before the update, and the print setting dialog 501 is closed.

Although not described here, an update button can be added to update and store the selected contents of the print setting. Thus, the print setting dialog 501 is configured as a set of necessary items for a user, and helps the user immediately check the current print settings.

FIG. 7 is a frameless printing support paper table managed by the special print support paper table 614 shown in FIG. 2.

In FIG. 7, a group or paper type column in the table is described by the name of a paper group or a type of paper detected by the media sensor 604 shown in FIG. 1. The frameless printing possibility column contains one of "possible", "partially possible", and "impossible" each of which indicates whether or not frameless printing can be performed on each paper group or paper type. The "possible" indicates that the frameless printing can be performed on the paper group or the paper type. The "partially possible" indicates that the frameless printing can be performed on a part of paper type in the paper group, and the frameless printing cannot be performed on the other paper types.

The "impossible" indicates that the frameless printing cannot be performed on the paper group or the paper type. As shown in FIG. 6, when the paper selected by the paper type display/operation control 502 does not support frameless printing, the frameless printing check box 506 is grayed out for rejection of a check.

FIG. 8 is a frameless printing support paper table managed by the special print support paper table 614 shown in FIG. 2.

In FIG. 8, a group or paper type column in the table is described by the name of a paper group or a type of paper detected by the media sensor. The double-sided printing possibility column contains one of "possible", and "impossible" each of which indicates whether or not double-sided printing can be performed on each paper group or paper type. The "possible" indicates that the double-sided printing can be performed on the paper group or the paper type.

The "impossible" indicates that the double-sided printing cannot be performed on the paper group or the paper type. As shown in FIG. 6, when the paper selected by the paper type display/operation control 502 does not support double-sided printing, the double-sided printing check box 507 is grayed out for rejection of a check.

The correspondence between the dialog shown in FIG. 6 and the groups 1 to 4 in the table shown in FIGS. 7 and 8 and various media is explained below.

In FIG. 6, assume that the paper type detection check box 503 is checked and the frameless printing is designated. If the feature information obtained from the printer 601 is determined in paper detection and it is designated that the group is one of the groups 1 to 4, and if the detected medium group is the group 1, then, for example, the frameless printing can be "possible" on the group 1 shown in FIG. 7, settings are determined to match each other, and the frameless printing process is continued.

Similarly, if the double-sided printing is designated, and the determined group is the group 1, then the double-sided printing can be performed on the group 1 shown in FIG. 8 and the settings match each other, thereby continuing the double-sided printing process.

Furthermore, if no check is made in detecting paper as shown in FIG. 6, a type of paper is designated, and the settings match each other from the possibility of the frameless printing on the individual paper name shown in FIG. 7 and the possibility of the double-sided printing for the individual paper name shown in FIG. 7, then the frameless printing process or the double-sided printing process is continued.

FIG. 9 shows the data format of a paper setting command contained in the leading portion of the print data generated by the print data generating process unit 618 shown in FIG. 2.

In FIG. 9, each frame indicates data of 1 byte, the leading three bytes are escape sequence indicating a paper setting command, the following two bytes indicate the number of bytes of the subsequent command, and the first byte of the final two bytes is a value indicating whether or not print data has been generated in the valid status of the paper type detecting function. If it is "1", the print data has been generated in the valid status of the paper type detecting function. If it is "0", the print data has been generated in the invalid status of the paper type detecting function.

The second byte of the final two bytes is a value indicating the paper group of the paper detected by the media sensor when the print data is generated in the valid status of the paper type detecting function. For example, it is "1" in the case of the group 1, "2" in the case of the group 2, "3" in the case of the group 3, and "4" in the case of the group 4. In the print data generated in the invalid status of the paper type detecting function, the value is "0".

FIG. 10 shows the data format of the frameless printing setting command contained in the leading portion of the print data generated by the print data generating process unit 618 shown in FIG. 2.

In FIG. 10, the leading three bytes are an escape sequence indicating a frameless printing setting command, the following two bytes are values indicating the number of bytes of a subsequent command, and the final byte is a value indicating the ON/OFF of the frameless printing. If the frameless printing is ON, "1" is set. If the frameless printing is OFF, "0" is set.

FIG. 11 shows the data format of the double-sided printing setting command contained in the leading portion of the print data generated by the print data generating process unit 618 shown in FIG. 2.

In FIG. 11, the leading three bytes are an escape sequence indicating a double-sided printing setting command, the following two bytes are values indicating the number of bytes of a subsequent command, and the final byte is a value indicating the ON/OFF of the double-sided printing. If the double-sided printing is ON, "1" is set. If the double-sided printing is OFF, "0" is set.

FIG. 12 shows an example of a warning dialog (UI) displayed on the setting information notification unit 617 shown in FIG. 1, and shows an example of displaying a warning dialog box displayed after data transfer is suspended if, in the printing system according to the present embodiment, the paper which is set on a printer when print data is generated and based on which print data has been generated does not match, in paper group, the paper set on the printer when print data is transferred. This corresponds to the warning UI issued in step S1306 shown in FIG. 14 described below.

In FIG. 12, the dialog box has two buttons for continuing printing and stopping printing. The continue printing button is pressed when the paper is reset and printing is continued, or when the user continues printing with a mismatch recognized. When it is pressed, the dialog box is closed and the transfer of print data is started. It also allows a user to have the opportunity of continuing printing with the paper recovered to what is set on a printer when print data is generated.

On the other hand, the stop printing button is pressed when printing is stopped. When it is pressed, the print data is discarded from the print spooler 622, the process relating to the printing is stopped, thereby closing the dialog box.

If the UI shown in FIG. 12 includes the information about the type to which a certain type of paper is changed, a user can easily determine whether or not the current paper is to be changed.

Figure 13:
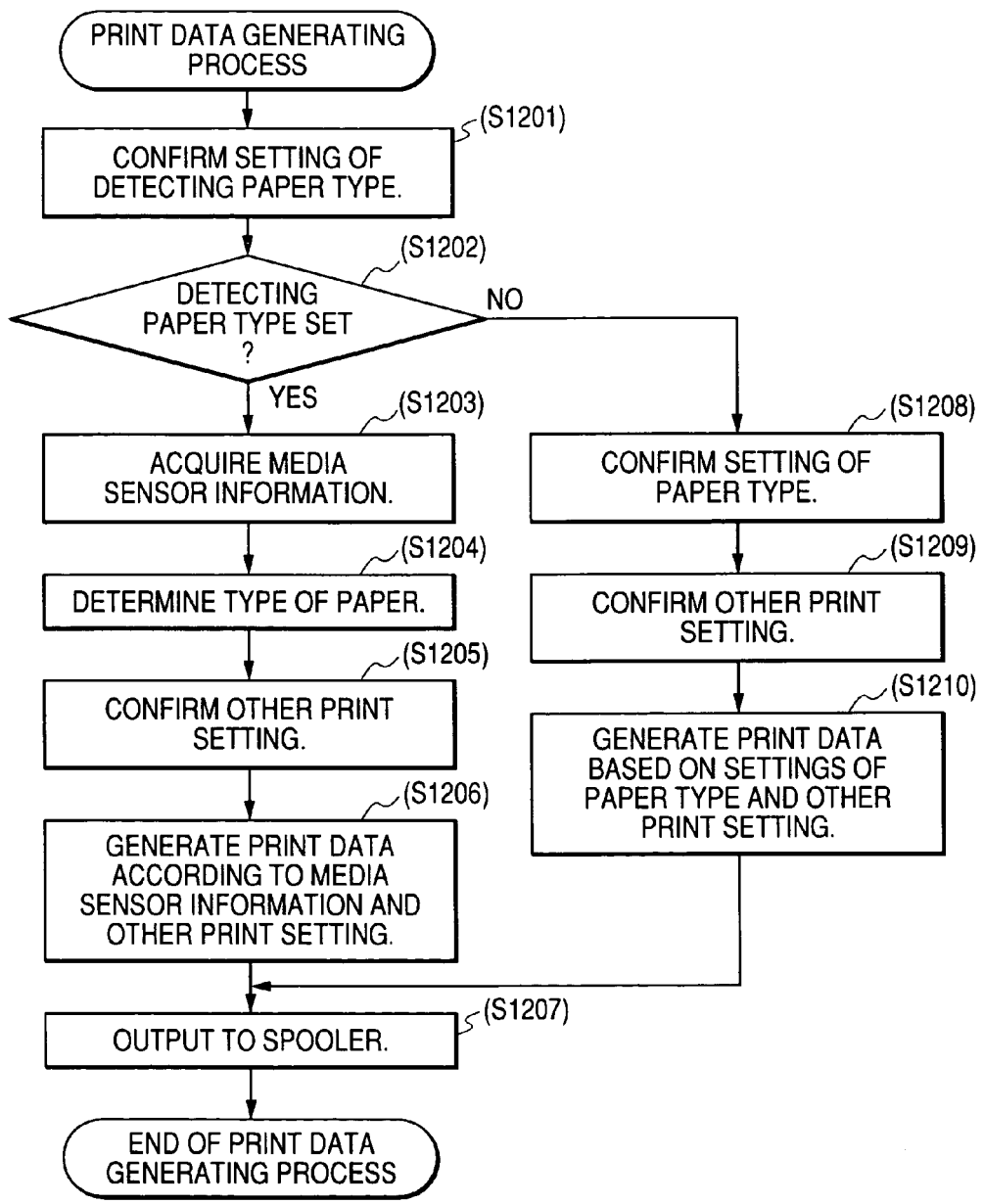
FIG. 13 is a flowchart showing an example of the first data processing procedure of the data processing apparatus according to the present invention.

FIG. 13 is a flowchart showing an example of the first data processing procedure in the data processing apparatus according to the present invention, and corresponds to the process procedure of the print data generating process by the print data generating process unit 618 shown in FIG. 2. S1201 to S1210 indicate the respective steps. The present print data generating process is performed after a user performs a printing operation, and generates print data to be transferred to the printer 601 based on the contents of each item set in the print setting dialog box shown in FIG. 6 based on the data of the document, etc. generated by application software.

First, the contents set and stored in the paper type detection check box 503 of the print setting dialog box 501 are confirmed (S1201). After the confirmation, it is determined whether or not detecting the type of paper is set (S1202). If it is determined that detecting the type of paper is set, then control is passed to step S1203. If it is determined that detecting the type of paper is not set, then control is passed to steps in and after S1208. In the process in step S1201, if the paper type detection check box 503 is checked, it is requested to detect a medium, and a predetermined type of paper set in the column of the paper type display/operation control 502 is plain paper or the default by the printer driver, then it can be determined YES in step S1202.

Thus, if it is automatically confirmed that the type of paper set through the setting screen shown in FIG. 6 is a predetermined type (for example, plain paper) or a default, and it is set that the medium type is obtained in the paper type detection check box 503, then media information is obtained, and print data is generated according to the obtained media information. Therefore, although a print instruction is issued with the type of paper set as a default (plain paper) without setting details of the printer on the setting screen shown in FIG. 6 regardless of the settings of special paper such as glossy paper, etc. on the printer, the print data can be generated based on the feature of the type of paper set for the actual printing.

When the user sets the type of paper through the paper type display/operation control 502 shown in FIG. 6, the print data is not generated based on the detection of media and a detection result although the settings of obtaining the medium type of the paper type detection check box 503 shown in FIG. 6 are effectively set. Thus, any convenience of a user can be prioritized.

As a condition in performing step S1202, the following conditions (1) to (4) can be appropriately added based on the case in which the check box of the paper type detection check box 503 shown in FIG. 6 is effectively set.

(1) When the settings (of a paper feed unit) of the [paper feeding method] in the printer driver is the selection of a paper feed unit attached to the media sensor, (2) when a connected printer is the type of supporting the medium sensing function (the media sensor information contained in the device ID obtained from the printer contains the information as to whether or not the printer supports the medium sensing function), (3) when the medium sensing function of the body of the printer is effective, and the information obtained from the printer contains the information that the medium sensing function of the printer is ON. The setting can be made on the setting screen as shown in FIG. 6. (4) Excluding the period of the initialization at power-up, the occurrence of an error, etc. The type of medium is obtained from the printer depending on the effectiveness of a predetermined condition of a logical sum or a logical product of (1) to (4) combined arbitrarily and the setting for obtaining the type of medium of the 503. The above-mentioned predetermined medium (plain paper) or a default paper setting can be arbitrarily combined with the conditions of (1) to (4) above. A check for the setting of obtaining the type of medium of the 503 can be defined as a single condition of obtaining the type of medium.

When it is determined in step S1202 that detecting the type of paper is set, the printer 601 is requested for media sensor information, and obtains media sensor information (S1203). In step S1203, it is predicted that the latest media information cannot be acquired from the printer for any reason such as the printer being operated. In this case, the status such as "Obsolete media information", "Cannot update now.", etc. is returned from the printer, the host determines the type of medium based on the obtained history, or plain paper is forcibly adopted as the type of medium, thereby successfully determining the optimum type of medium although no media information can be obtained.

However, when the printer 601 cannot sense a medium, the printer 601 issues a notification of the information when the media information was previously obtained.

For example, the previous media information refers to the information obtained when the job being performed is started. Media information can be detected for each page. The same holds true in the transfer process.

Next, the type of paper is determined according to the media sensor information obtained from the printer 601 (S1204), and then other print settings are confirmed (S1205).

Practically, the paper feeding method, print quality, frameless printing ON/OFF, and double-sided printing ON/OFF are individually checked.

Then, print data is generated by referring to the above-mentioned print profile storage unit based on the type of paper determined in step S1204 and the print setting confirmed in step S1205 (S1206).

The print data generated at this time contains the paper setting command, the frameless printing setting command, and the double-sided printing setting command explained by referring to FIGS. 9 to 11 with the determination result in step S1204 and the print setting confirmed in step S1205 reflected.

Then, the generated print data is output to the print spooler of the operating system (S1207), thereby terminating the print data generating process.

On the other hand, if it is determined in step S1202 that no detecting the type of paper is set, then the setting of the type of paper selected and stored by the paper type display/operation control 502 of the print setting dialog box 501 is confirmed (S1208).

Then, other print settings are confirmed (S1209). Practically, the paper feeding method, print quality, frameless printing ON/OFF, double-sided printing ON/OFF are confirmed.

The print data is generated by referring to the above-mentioned print profile storage unit based on the type of paper confirmed in step S1208 and the print setting confirmed in step S1209 (S1210). The print data generated at this time contains the paper setting command, the frameless printing setting command, and the double-sided printing setting command explained by referring to FIGS. 9 to 11.

As described above, the paper setting command designates a specific fixed value when the paper type detection check box is OFF. The frameless printing setting command and the double-sided printing setting command reflect the print settings confirmed in step S1209.

Then, the generated print data is output to the print spooler of the operating system (S1207), thereby terminating the print data generating process.

The data processing method with the data processing apparatus according to the present invention is explained below by referring to the flowcharts shown in FIGS. 14 and 15. The flowcharts shown in FIGS. 14 and 15 are used in combination with the flowchart shown in FIG. 13 when a predetermined print job is processed, and the process shown in FIG. 14 can be performed after the process shown in FIG. 15, or the processes in FIGS. 14 and 15 can be concurrently or simultaneously performed, but the order is appropriately defined.

Figure 14:
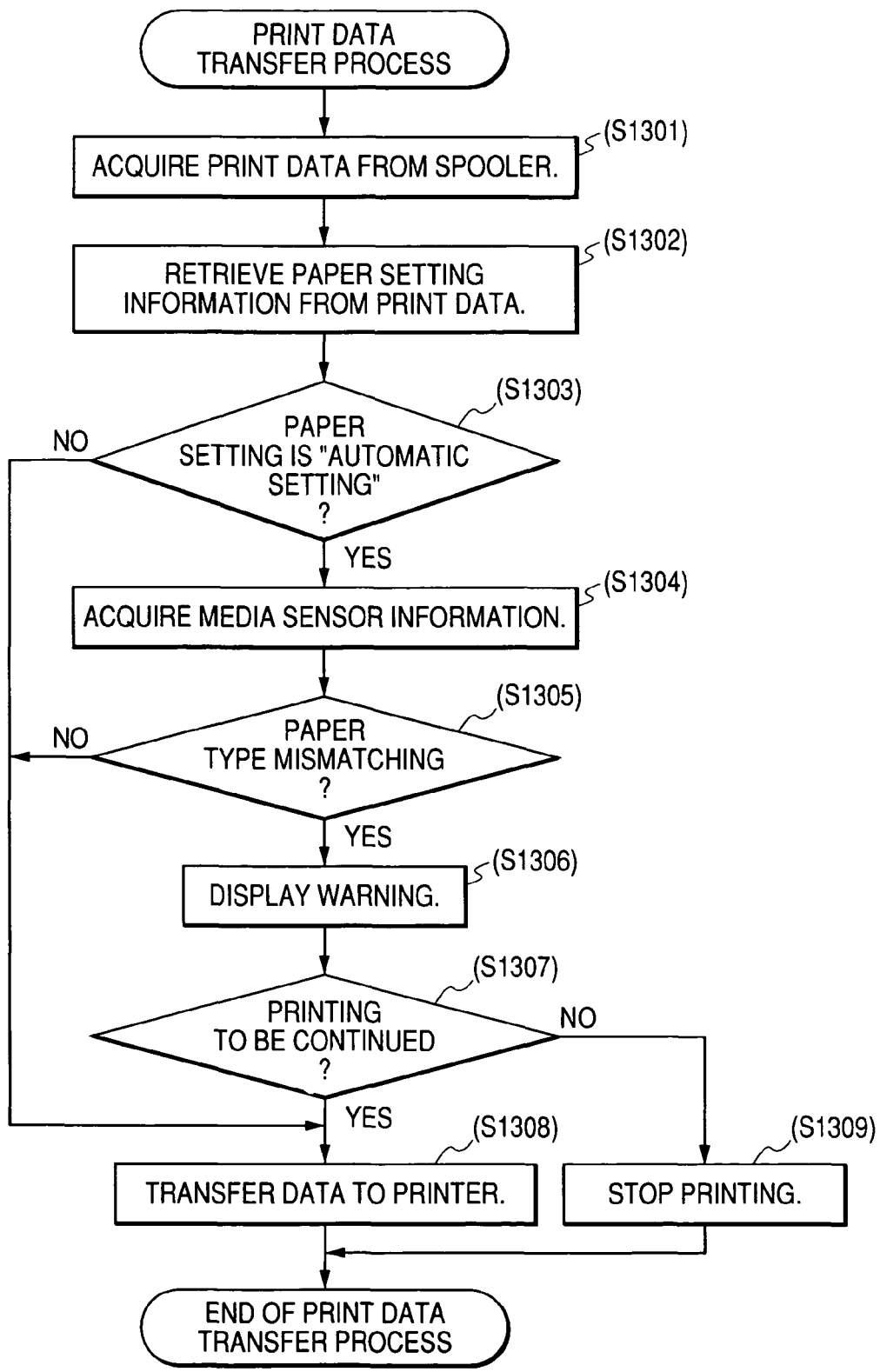
FIG. 14 is a flowchart showing an example of the second data processing procedure of the data processing apparatus according to the present invention.
Figure 15:
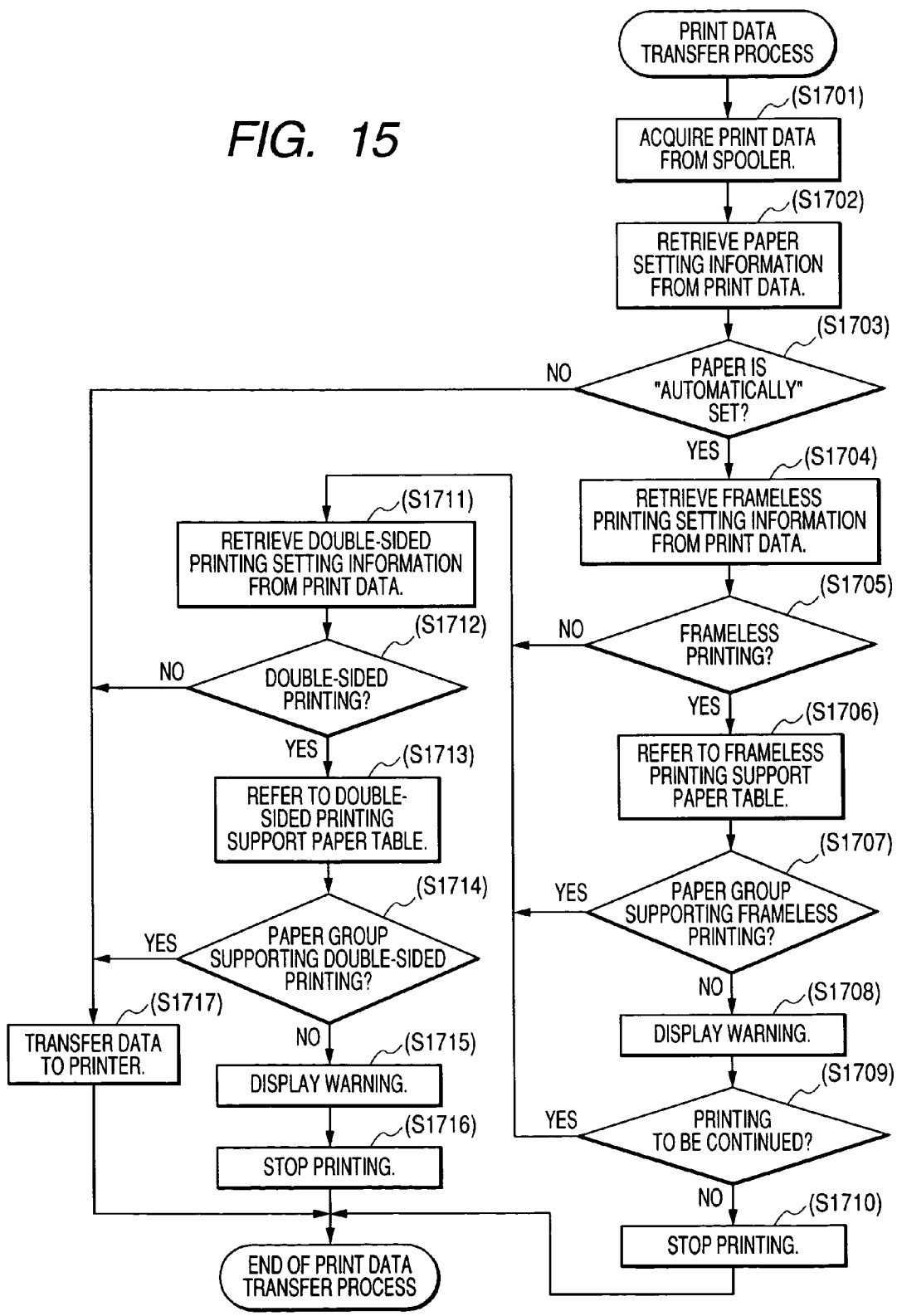
FIG. 15 is a flowchart showing an example of the third data processing procedure of the data processing apparatus according to the present invention.

FIG. 14 is a flowchart showing an example of the second data processing procedure with the data processing apparatus according to the present invention, and corresponds to the print data transfer processing procedure by the data communications process unit 621 shown in FIG. 2. The print data transfer process is a process of obtaining from a print spooler the print data generated in the above-mentioned print data generating process and sequentially transferring the data to the printer. This process is performed immediately before starting printing.

The process of detecting the type of paper set on the printer again in the print data transfer process is performed to avoid the print processing with a mismatch detected between the print data and the paper occurring when print data is generated and then another type of paper is newly set, which causes a conventional problem. S1301 to S1309 indicate the respective steps.

First, in step S1301, print data is acquired from the print spooler. Then, paper setting information is retrieved from the obtained print data (S1302). The paper setting information is the paper setting command shown in FIG. 9, and contains the information about whether or not the print data has been generated in the valid status of the paper type detecting function.

Then, it is determined from the paper setting command obtained in step S1302 whether or not the print data has been generated in the valid status (the paper is "automatically" set) of the paper type detecting function (S1303). If it is determined that the print data has been generated in the valid status of the paper type detecting function, then control is passed to step S1304. Otherwise, control is passed to step S1308.

If it is determined that the print data has been generated in the valid status of the paper type detecting function, the media sensor information is obtained from the printer 601 again, and the paper group of the paper set on the printer is determined by referring to the paper type determining table 613 (S1304).

Then, the paper group detected by the media sensor when the print data is generated, and contained in the paper setting information obtained in step S1302 is referred to. It is determined whether or not the group matches the paper group determined in step S1304 (S1305). If it is determined that the paper groups do not match, then control is passed to step S1306. If it is determined that the paper group match each other, then control is passed to step S1308.

If it is determined that the paper groups do not match each other, the warning dialog box shown in FIG. 12 is displayed on the display device of the setting information notification unit 617 to receive the input from the user (S1306).

While waiting for the user input, no print data is transferred to the printer 601.

Then, in step S1307, the user input to the dialog box shown in FIG. 12 is determined (S1307), thereby branching the process.

That is, if the user presses the "continue printing" button in the dialog box and determines to select continuing the printing as shown in FIG. 12, then control is passed to step S1308.

If the user presses the "stop printing" button in the dialog box and determines to select stopping the printing in step S1307, then control is passed to step S1309.

On the other hand, if it is determined in step S1303 that the print data has been generated in the invalid status of the paper type detecting function, or if the user selects continue printing in step S1307, then the print data is transferred to the printer 601 (S1308), and after the completion of the transfer, the print data transfer process is terminated. Then, the printer 601 performs printing based on the transferred print data.

If the user selects stopping the printing in step S1307, the print data obtained from the print spooler 622 is discarded, thereby stopping the print processing.

In the explanation of the print data generating process and the print data transfer process, the print data generated in the print data generating process is stored in the print spooler 622, and then the print data transfer process obtains the print data from the print spooler 622 and transfers the data to the printer 601. On the other hand, it is also possible to spool intermediate format data in the spooler for generation of print data.

FIG. 15 is a flowchart showing an example of the third data processing procedure by the data processing apparatus according to the present invention, and corresponds to the print data transfer processing procedure according to the present embodiment. This data transferring process is to obtain the print data generated in the above-mentioned print data generating process from the print spooler 622, and sequentially transfer the data to the printer 601, which is performed immediately before starting the printing. S1701 to S1717 indicate the respective steps.

Figure 16:
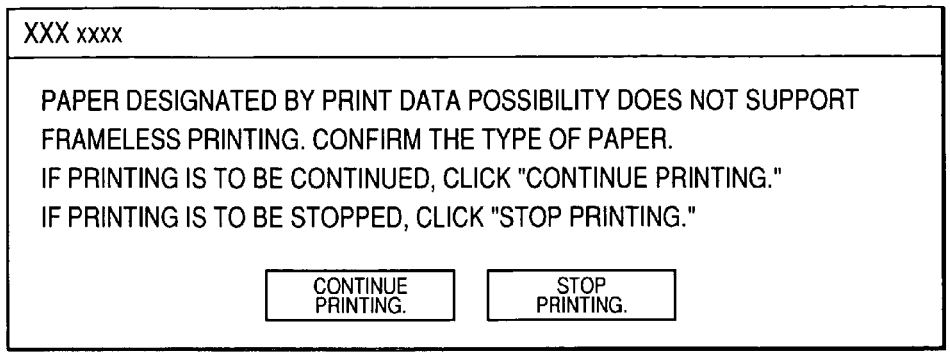
FIG. 16 shows an example of a warning dialog (UI) displayed on the setting information notification unit shown in FIG. 1.

FIG. 16 shows an example of a warning dialog (UI) displayed on the setting information notification unit 617 shown in FIG. 1, and corresponds to a display example of a frameless printing warning dialog (1) to be displayed before print data is transferred if a printing operation is performed with frameless printing set, and the paper group detected before generating print data in the paper type detecting process is a paper group containing the paper not supporting frameless printing.

The frameless printing warning dialog (1) shown in FIG. 16 is displayed when the type of medium detected in step S1203 when print data is generated can include the type of paper which supports the frameless printing and the type of paper which does not support the frameless printing as the paper group 2 shown in FIG. 7. When the user presses the continue printing button of the dialog box, the print data is transferred to the printer, and the print processing is performed. When the user presses the stop printing button of the dialog box, the print data is discarded, and no printing process is performed. The printing warning dialog shown in FIG. 16 includes a button for providing an opportunity of continuing printing because a part of the paper set on the printer supports the frameless printing.

Figure 17:
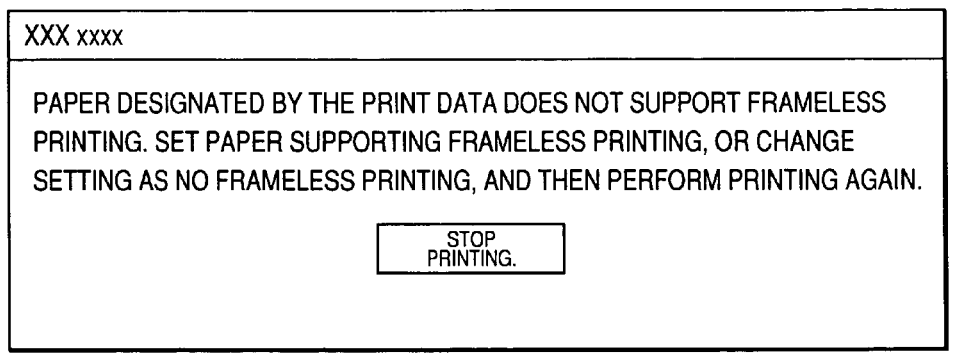
FIG. 17 shows an example of a warning dialog (UI) displayed on the setting information notification unit shown in FIG. 1.

FIG. 17 shows an example of the warning dialog (UI) displayed on the setting information notification unit 617 shown in FIG. 1, and corresponds to an example of displaying the frameless printing warning dialog (2) to display data before transferring print data when a printing operation is performed with the frameless printing set, and the paper group detected before generating print data in a paper type detecting process is a paper group which does not support the frameless printing.

The frameless printing warning dialog (2) shown in FIG. 17 is displayed when the type of medium detected when print data is generated in step S1203 of all paper contained in the paper groups 1, 3, and 4 shown in FIG. 7 does not support the frameless printing. When the user presses the stop printing button, the print data is discarded, and no printing process is performed.

Figure 18:
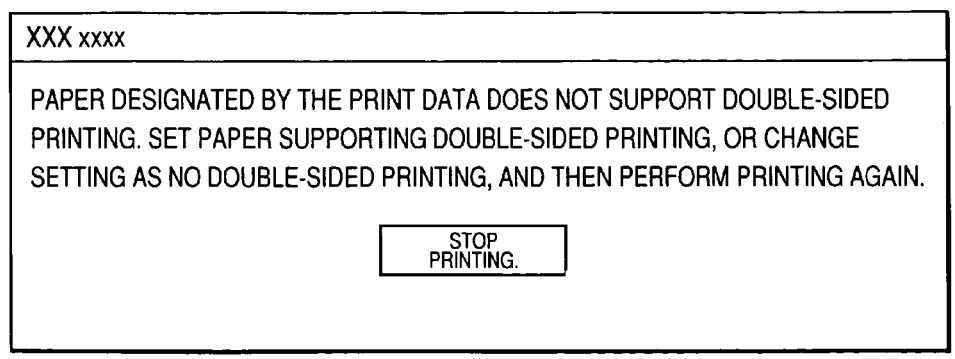
FIG. 18 shows an example of a warning dialog (UI) displayed on the setting information notification unit shown in FIG. 1.

FIG. 18 shows an example of the warning dialog (UI) displayed on the setting information notification unit 617 shown in FIG. 1, and corresponds to an example of displaying the double-sided printing warning dialog to display data before transferring print data when a printing operation is performed with the double-sided printing set, and the paper group detected before generating print data in a paper type detecting process is a paper group which does not support the double-sided printing. When the user presses the stop printing button, the print data is discarded, and no printing process is performed.

If the warning screen, etc. is displayed to stop the process during generation of data when the printing such as frameless printing, double-sided printing, etc. which is supported by only a part of a paper group and the paper group detected when the print data is generated does not support the printing as pointed out above as the conventional problem, then the subsequent print processing is delayed and the efficient of the system is badly reduced. To avoid this, the warning screen, etc. is displayed in the data transfer process.

First, in step S1701, print data is obtained from a print spooler. Then, the paper setting information is retrieved from the obtained print data (S1702). The paper setting information is a paper setting command shown in FIG. 9, and contains the information indicating whether or not the print data has been generated in the valid status of the paper type detecting function.

When the print data is generated in the valid status of the paper type detecting function, the information about the paper group when the print data is generated is contained. If it is determined from the paper setting command obtained in step S1702 whether or not the print data has been generated in the valid status (paper setting is "automatic") of the paper type detecting function (S1703), and it is determined that the print data has been generated in the valid status of the paper type detecting function, then control is passed to step S1704. Otherwise, control is passed to step S1717.

On the other hand, if it is determined in step S1703 that the print data has been generated in the valid status of the paper type detecting function, then the frameless printing setting information is retrieved from the print data (S1704).

The frameless printing setting information is a frameless printing setting command, and contains the information about whether or not the print data refers to the print data for frameless printing.

If it is determined whether or not the print data refers to the print data for the frameless printing from the frameless printing setting command obtained in step S1704 (S1705), and the obtained print data refers to the print data for the frameless printing, then control is passed to step S1706. If it is not the print data for the frameless printing, control is passed to step S1711.

If it is the print data for the frameless printing, then the frameless printing support paper table is referred to (S1706). If it is determined whether or not the paper group contained in the paper setting command obtained in step S1702 is a paper group which supports the frameless printing (S1707), and if it is determined that it is the paper group which supports the frameless printing (paper group described as "possible" in the frameless printing possibility column shown in FIG. 7), then control is passed to step S1711. If it is determined that it is the paper group which does not support the frameless printing (paper group described as "partially possible" or "impossible" in the frameless printing possibility column shown in FIG. 7), then control is passed to step S1708.

In step S1708, any of the frameless printing warning dialog explained by referring to FIG. 16 or 17 is displayed on the display device of the setting information notification unit 617 shown in FIG. 1, and control is passed to step S1709. FIG. 16 or 17 is discriminated based on which group the medium type group (the print setting command shown in FIG. 9) detected by the media sensor belongs to in the table shown in FIG. 7. Practically, if it is the group 2 shown in FIG. 7, then the warning display shown in FIG. 16 is performed. If it is the group 1, 3, or 4, then the warning display shown in FIG. 17 is performed.

Which is to be displayed, the frameless printing warning dialog (1) shown in FIG. 16 or the frameless printing warning dialog (2) shown in FIG. 17, depends on the following conditions. That is, if the paper group of the paper setting information obtained from the print data in step S1702 is the paper group described as "partially possible" in the frameless printing possibility column shown in FIG. 7, then the frameless printing warning dialog (1) is displayed. If it is the paper group described as "impossible", then the frameless printing warning dialog (2) is displayed.

In step S1709, the process is branched depending on whether the user selects continuing the printing or stop printing in the dialog box displayed in step S1708.

If it is determined that continuing the printing is selected in the dialog box shown in FIG. 16 or 17, then control is passed to step S1711. If it is determined that stopping the printing is selected, then control is passed to step S1710.

If the dialog box displayed in step S1708 is a frameless printing warning dialog (2), then control is not passed to step S1711 because the user has only one choice of stopping the printing.

If it is determined in step S1709 that stopping the printing has been selected in the dialog box displayed in step S1708, then print data is discarded to stop the print processing and terminate the data transfer process (S1710).

If stopping the printing is selected in the dialog box displayed in step S1708, the double-sided printing setting information is retrieved from the print data (S1711).

The double-sided printing setting information is a double-sided printing setting command, and contains the information about whether or not the print data refers to the print data for double-sided printing.

If it is determined whether or not the print data refers to the print data for the double-sided printing from the double-sided printing setting command obtained in step S1711 (S1712), and the obtained print data refers to the print data for the double-sided printing, then control is passed to step S1713. If it is not the print data for the double-sided printing, control is passed to step S1717.

If it is the print data for the double-sided printing, then the double-sided printing support paper table is referred to (S1713). If it is determined whether or not the paper group contained in the paper setting command obtained in step S1702 is a paper group which supports the double-sided printing (S1714), and if it is determined that it is the paper group which supports the double-sided printing (paper group described as "possible" in the double-sided printing possibility column shown in FIG. 7), then control is passed to step S1717. If it is determined that it is the paper group which does not support the double-sided printing (paper group described as "impossible" in the double-sided printing possibility column shown in FIG. 7), then control is passed to step S1715.

In step S1715, the double-sided printing warning dialog explained above by referring to FIG. 18 is displayed on the display device of the setting information notification unit 617 shown in FIG. 1.

In the dialog box displayed in step S1715, the user can select stopping the printing only.

When the user presses the stop printing button, control is passed to step S1716.

In step S1716, the print data is discarded, the print processing is stopped, and the data transfer process is terminated.

If it is determined in step S1703 that the print data has not been generated in the valid status of the paper type detecting function, if it is determined in step S1712 that the print data is not the data for double-sided printing, and if it is determined in step S1714 that the paper group of the paper setting information retrieved in step S1702 is a paper group which supports the double-sided printing, then the print data obtained from the print spooler 622 is transferred to the printer 601, and after the transfer the print data transfer process is terminated (S1717).

Then, the printer 601 performs printing according to the transferred print data.

As described above, the present embodiment is configured by the printer 601 having the paper type detecting function of detecting the type of paper, and the PC 602 connected to the printer through an appropriate I/F, determines the type of the paper (record medium 600) set on the printer 601 when print data in the PC 602 is generated, generates print data based on the determination result, adds to the print data the information as to whether or not the printing such as frameless printing, double-sided printing, etc. which can be performed only by a specific paper group is designated, determines the paper group and the presence/absence of frameless printing and double-sided printing by referring to the print data when the print data is transferred from the PC 602 to the printer 601, and issues a warning to a user when a paper group not appropriate for the specific printing is designated, thereby realizing a user-operable printing system capable of preventing printing in an inappropriate setting without a delay of the print processing of the system by displaying a warning, etc. when print data is generated.

The media sensor 604 according to the present embodiment has detection characteristics different from those of the paper sensor of the above-mentioned patent documents 1 and 2 (in determining a group) and has a plurality of detection timing. Especially when the medium detected during the generation of print data and the medium detected when generated print data is transferred to a printer are different from the medium set in the printing condition, the type of record medium can be changed with arbitrary timing without permission because there are a plurality of users sharing a printer in a network environment. If such a change of record media is taken into account in transferring print data based on the matching condition of the detected type, a print result is inappropriate.

On the other hand, according to the present embodiment, the type of record medium which can be fed is obtained from a printer at least twice with different data process timing to determine whether or not the type matches the set type of printing conditions. Therefore, the present invention is more useful than the above-mentioned patent documents 1 and 2 or a combination of them in solving the problem of generating a printing problem.

Furthermore, the group of the record medium detected by a media sensor can contain a plurality of record media in the same group. Depending on each medium, there can be a problem of support of frameless printing and double-sided printing. However, the problem can be solved by managing an appropriate table and the consistency of the combination can be maintained. Therefore, the effect of the above-mentioned embodiment cannot be covered by the above-mentioned patent documents 1 and 2 and a combination of them.

According to the applicant of the present invention, the paper sensing process performed with a plurality of timing as disclosed by the patent document 1 does not imply the concept of the determination as a group, but the detection of plural types of record media as 1:1, which is the important point in considering the difference between the patent documents and the present invention. It is obvious that, according to the embodiments of the present invention, a media sensor capable of detecting a plurality of types of record medium as 1:1 can be realized and loaded for a printer.

Second Embodiment

The entire flow of the print processing when intermediate format data is spooled in the print spooler 622 shown in FIG. 2 is explained below by referring to FIGS. 19 and 20. The predicted intermediate format data files can be the files of EMF (Enhanced MetaFile) a PDF format file, an SVG format file, etc.

Figure 19:
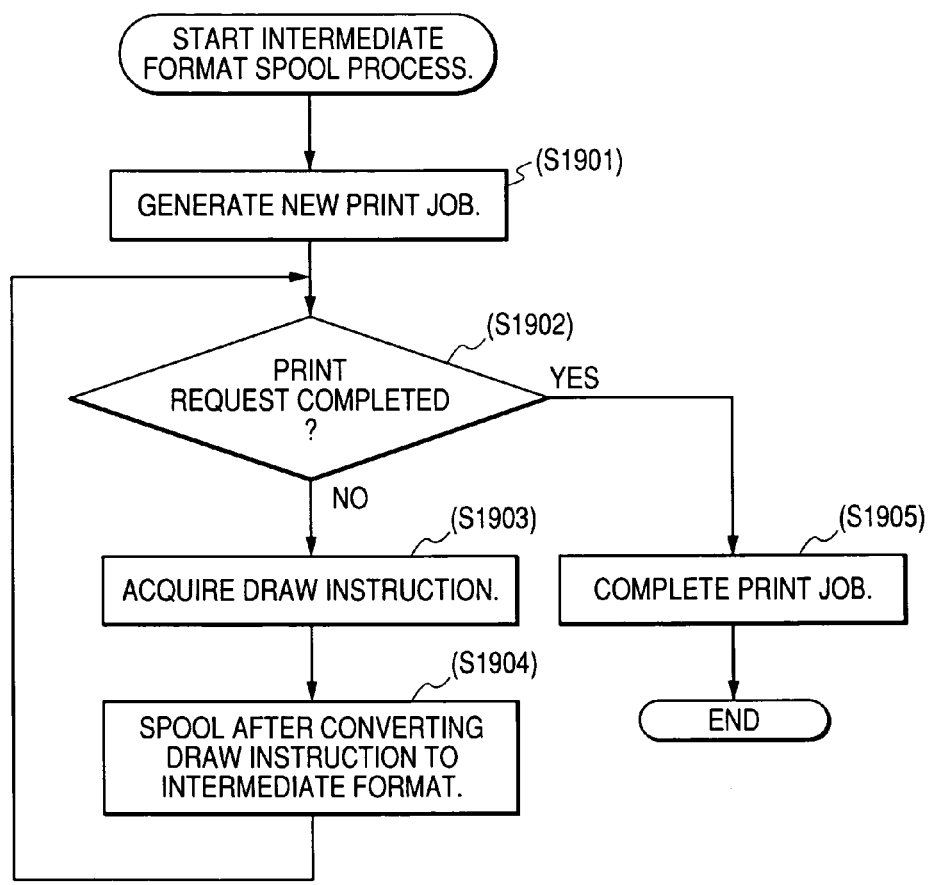
FIG. 19 is a flowchart showing an example of the fourth data processing procedure of the data processing apparatus according to the present invention.

FIG. 19 is a flowchart showing an example of the fourth data processing procedure for use with the data processing apparatus according to the present invention, and corresponds to the process procedure of the intermediate format data spooling process. S1901 to S1905 indicate the respective steps.

First, when a printing operation is performed using an application, the process is called, an intermediate format data for generation of print data is generated, and a spooling process is performed.

In step S1901, in response to a new print request, a new print job is generated.

Then in step S1902, it is confirmed whether or not a print request has been issued. Normally, a print request does not terminate immediately after a new print request is issued, but a print request terminates after a notification of a series of draw instructions.

Then, if it is determined in step S1902 that a print request has not terminated, control is passed to step S1903, and a draw instruction is obtained.

A draw instruction in the present embodiment refers to drawing graphic elements such as a line, an ellipse, a rectangle, etc. and drawing a bit map image, a character, etc.

Normally these draw instructions are converted into a print data format supported by a printer in the process of a printer driver. For example, a printer driver for a printer which supports the print data of a raster image format can develop a received draw instruction on memory, generate a raster image, and transfer the generated raster image by segmenting it into appropriate bandwidths, thus generating print data.

Normally, the print data generating process requires a large number of arithmetic operations, and the process also requires a long time.

The merit of spooling data in an intermediate format is that the time taken in performing a spooling process can be shortened and the print processing of the application can be completed within a short time by performing later the time consuming print data generating process, and spooling intermediate format data which is close to an draw instruction.

In step S1904, a draw instruction received from the application is converted into intermediate format data, and spooled in the print spooler 622. The conversion into intermediate format data is a process of converting each draw instruction to a specific format. Then, control is passed to step S1902, and the subsequent processes are repeated.

When it is determined in step S1902 that a print request is completed, control is passed to step S1905, and a process of completing a print job is performed. In this process, a print job is generated in a spooler as a printing process requested from an application. In step S1905, a spooling process is completed as a series of intermediate format data, thereby terminating the process.

Figure 20:
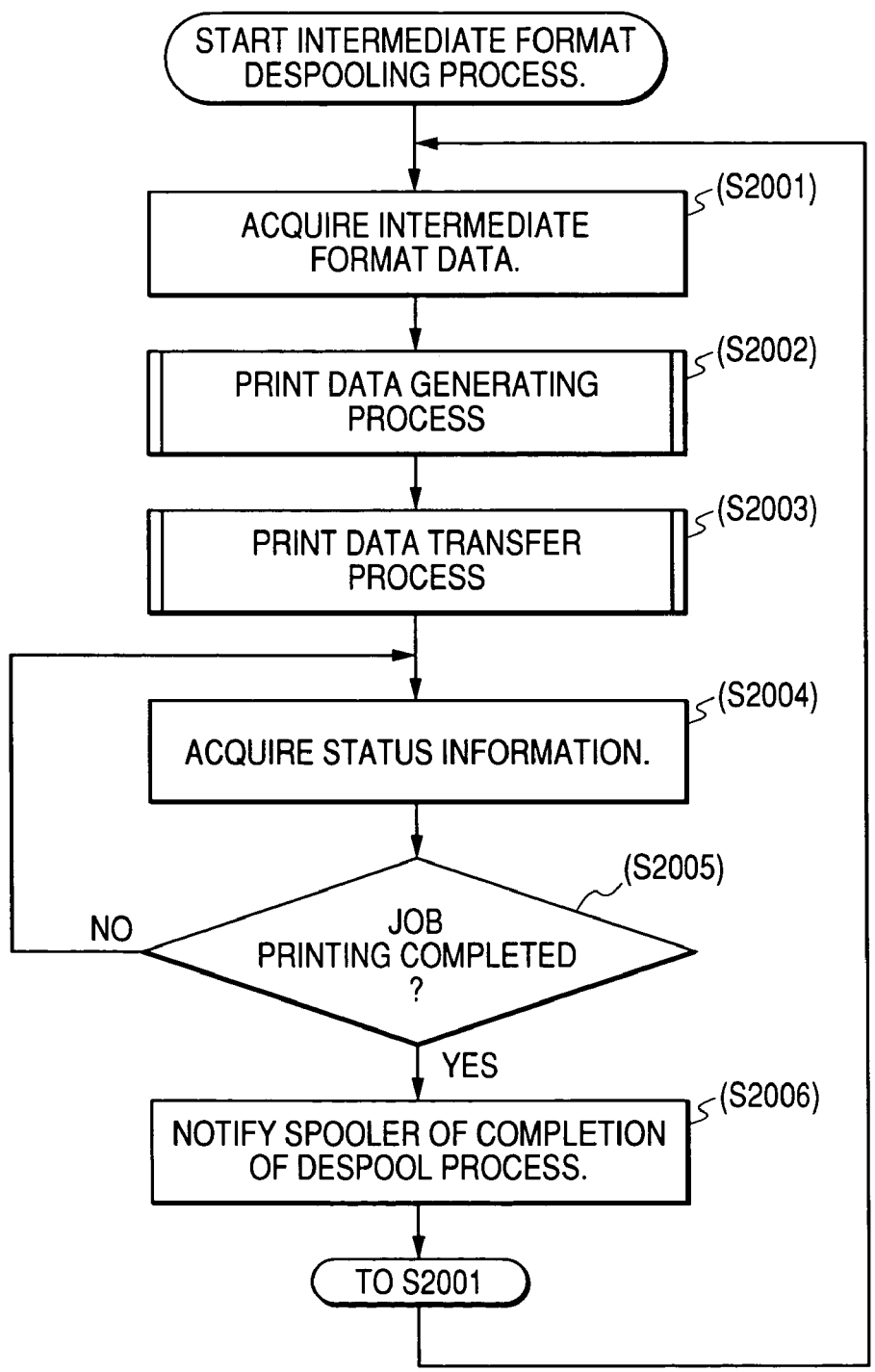
FIG. 20 is a flowchart showing an example of the fifth data processing procedure of the data processing apparatus according to the present invention.

FIG. 20 is a flowchart showing an example of the fifth data processing procedure with the data processing apparatus according to the present invention, and corresponds to the process procedure of obtaining intermediate format data spooled in the process shown in FIG. 15 from the spooler, generating print data, and transferring the data to a printer, thus performing the intermediate format despooling process. S2001 to S2006 indicate the respective steps. The process shown in FIG. 20 is a detailed procedure of transferring data to a printer after sequentially converting a single or a plurality of spooled data in an intermediate format generated in the process shown in FIG. 19.

First, in step S2001, in response to a print request from a spooler for spooling intermediate format data generated from application data, intermediate format data of a print job is obtained. Then, in step S2002, print data is generated from intermediate format data. This process corresponds to the print data generating process explained above by referring to FIG. 13. In this process, media sensor information is obtained from the printer, an image processing is performed based on the obtained information and the contents set by the user on the setting screen, and a process of generating print data from intermediate format data is performed.

In the process shown in FIG. 13, the generated print data is output to the spooler, but when print data is generated from the data temporarily spooled in the intermediate format, the generated print data is passed to the print data transfer process in step S2003 to be transferred to the printer 601. In this process in step S2002, a medium can be detected to generate print data depending on the type of medium with timing closer to the process of transferring print data than the process according to the first embodiment, thereby detecting a medium with more appropriate timing.

That is, in step S2005 described later, it is determined whether or not the end of the job to be previously completed has been confirmed based on the intermediate format data. If it has been confirmed, the process in step S2001 is started in response to the notification in step S2006. Therefore, print data can be generated based on the more appropriate media detection result.

Then, in step S2003, the print data generated in step S2002 is transferred to the printer 601. This process corresponds to the print data transfer process explained by referring to FIGS. 14 and 15.

In the explanation relating to FIGS. 14 and 15, the print data is obtained from the print spooler 622. However, when print data is generated from the data temporarily spooled in the intermediate format, the print data received from the print data generating process in step S2002 is transferred to the printer 601. At this time, as explained by referring to FIG. 14, media sensor information is obtained from the printer, and the process of confirming the presence/absence of the mismatch with print data and generating appropriate print data, etc. are performed.

When all print data is transferred, control is passed to step S2004, and a process of obtaining status information from a printer is performed. This process is performed to check whether or not all transferred print data has been completed, and the status information obtained from the printer contains the information about the process status of the print job.

Then, in step S2005, it is determined from the status information obtained in step S2004 whether or not the print job has been completed. If it is determined that the print job has been completed, then control is passed to step S2006. If it is determined that the print job has not been completed, control is returned to step S2004, and the status information is obtained again.

In step S2006, if the print processing of the printer on the transferred print data has been completed, the spooler is notified of the completion of the process.

Normally, the process is performed by setting the value indicating that the process has been completed as an output value from the print spooler 622 in calling a function.

The first and second embodiments of the present invention are explained above. The present invention is configured by the printer 601 having the paper type detecting function of detecting the type of paper, and the PC 602 connected to the printer through an appropriate I/F. When print data is generated by the PC 602, the type of paper (record medium 600) set on the printer 601 is determined. Based on the result, print data is generated, and the type of paper (record medium 600) set on the printer 601 is determined again when print data is transferred from the PC 602 to the printer 601. If they do not match each other, a warning is issued to the user. Therefore, a user-operable printing system capable of avoiding printing with a mismatch between print data and actual paper when, for example, a new different type of paper is set on a printer after print data is generated can be realized.

Third Embodiment

In the explanation above, the first and second embodiments explained above comprise the data processing apparatus (PC) 602 and a printing system including the printer 601, but the present invention is not limited to the above-mentioned printing system.

For example, the data processing apparatus 602 can be a printer controller unit for performing various image processing, etc. on print data from an external device, and the printer 601 can be a printer engine unit for printing print data received from the printer controller unit. That is, in this case, the configuration including the printer controller unit and the printer engine unit can be defined as a data processing apparatus according to the present invention. In addition, an external device can provide print data with various image processing, etc., which can be recognized as generating new print data from the viewpoint of generating new data. The image processing performed by the printer controller unit can be, for example, a color spatial converting process, etc.

The configuration of the data processing program which can be read by the data processing apparatus according to the present invention is explained below by referring to the memory map shown in FIG. 21

FIG. 21 shows a memory map of a storage medium storing various data processing programs read by the data processing apparatus according to the present invention.

Although not shown in FIG. 21, the information for management of a program group stored in a storage medium, for example, version information, the name of an author, etc. is stored, and the information depending on the OS of a program reading side, for example, an icon for identification of a program, etc. can also be stored.

Additionally, the data depending on each program is also managed by the directory. When the program for installing various programs in a computer, and a program to be installed are compressed, a program for decompressing the programs can also be stored.

The functions according to the embodiment of the present invention as shown in FIGS. 13, 14, 15, 19, and 20 can be performed by a host computer using an externally installed program. In this case, the present invention can be applied when an information group including a program is provided from a storage medium such as CD-ROM, flash memory, an FD, etc. or externally from a storage medium over a network for an output device.

As described above, the object of the present invention can be attained by providing an storage medium recording a program code of software for realizing the function of the above-mentioned embodiment for a system or an apparatus, and by the system or the computer (or the CPU or MPU) reading and executing the program code stored in the storage medium.

In this case, the program code read from the storage medium realizes the new function of the present invention, and the storage medium storing the program code configures part of the present invention.

Therefore, the type of program is not specified regardless of an object code, a program executed by an interpreter, script data to be provided for the OS, etc. so far as a function of a program is included.

A storage medium for providing a program can be, for example, a flexible disk, a hard disk, an optical disk, a magneto-optical disk, MO, CD-ROM, CD-R, CD-RW, magnetic tape, a nonvolatile memory card, ROM, a DVD, etc.

In this case, the program code read from the storage medium realizes the functions of the embodiment, and the storage medium storing the program code configures part of the present invention.

As a method of providing a program, a computer program of the present invention from a home page of the Internet, which is accessed using a browser of a client computer, or a file which is compressed and contains an automatically installing function can be downloaded to a record medium such as a hard disk, etc. Additionally, the program code configuring part of the program of the present invention can be divided into a plurality of files so that each file can be downloaded from a different home page. That is, a WWW server, an ftp server, etc. for downloading to a plurality of users a program file for realizing the function processing of the present invention using a computer can be included in the claims of the present invention.

It is possible to realize the program of the present invention by encrypting and storing it in a storage medium such as CD-ROM, etc., distributing the result to a user, allowing the user who satisfies a predetermined condition to download key information for decryption from the home page over the Internet and execute the encrypted program according to the key information, and installing it in the computer.

It is also obvious that the present invention includes the case in which the functions of the above-mentioned embodiments are realized by executing the program code read by a computer, not only realizing the function of the above-mentioned embodiment, but also performing all or a part of the actual processes by the OS (operating system) operated in the computer according to the program code.

Furthermore, it is obvious that the present invention includes the case in which a program code read from a storage medium is written to the memory provided in a function expansion board inserted into a computer and a memory provided in a function expansion unit connected to a computer, the CPU, etc. provided for the function expansion board and a function expansion unit performs all or a part of the actual processes according to an instruction of the program code, and the functions of the above-mentioned embodiments are realized by the processes.

The present invention is not limited to the above-mentioned embodiments, but a number of variations can be realized within the gist of the present invention (including effective combinations of the embodiments).

Thus, various examples and embodiments of the present invention have been described above, but it is also obvious that one skilled in the art can recognize the gist and scope of the present invention without limiting them to specific explanation in the specifications, but include the following aspects 1 to 15 described below in detail.

[Aspect 1]

A data processing apparatus comprising: generation means (for example, a print data generating process unit 618 shown in FIG. 2) for generating print data; output means (for example, a data communications process unit 621 shown in FIG. 2) for outputting print data generated by the generation means; detection means (for example, a paper type determining process unit 612 shown in FIG. 2) for detecting a mismatch according to first medium information obtained with first timing when new print data is generated based on the original print data, and second medium information obtained with second timing before outputting print data generated by the generation means; and warning control means (for example, a print setting process unit 611 shown in FIG. 2) for issuing a warning based on the detection by the detection means.

[Aspect 2]

The data processing apparatus according to aspect 1, further comprising acquisition means (for example, a data communications process unit 621 shown in FIG. 2) for obtaining media information about a medium implemented in a printer comprising a media sensor, wherein the generation means generates print data according to media information obtained with the first timing by the acquisition means.

[Aspect 3]

The data processing apparatus according to aspect 1 or 2, wherein the acquisition means obtains information based on an output value of the media sensor, and, when there is no medium implemented, the generation means generates print data based on plain paper.

[Aspect 4]

The data processing apparatus according to any of aspects 1 to 3, further comprising: recognition means (for example, a paper type determining process unit 612 shown in FIG. 2) for recognizing a type of paper set on a setting screen; determination means (for example, a paper type determining process unit 612 shown in FIG. 2) for obtaining media information by the acquisition means when the type of paper recognized by the recognition means is a predetermined type or a default setting, and performing a process according to the obtained media information.

[Aspect 5]

The data processing apparatus according to any of aspects 1 to 4, further comprising read means (for example, a paper type determining process unit 612 shown in FIG. 2) for reading print setting generated by the generation means, wherein the warning control means detects a mismatch in print setting read by the read means according to second medium information obtained with the second timing.

[Aspect 6]

The data processing apparatus according to any of aspects 1 to 5, further comprising table means (for example, a paper type determining table 613 shown in FIG. 2) capable of designating applicability between a type of medium and print setting, wherein the warning control means issues a warning based on the table means, the second medium information, and the print setting.

[Aspect 7]

The data processing apparatus according to any of aspects 1 to 6, wherein: the table means comprises three levels of correspondence, non-correspondence, and partial correspondence or more (refer to the table shown in FIG. 7) as matching relation between a type of a medium and print setting; the warning control means determines whether or not a continuation choice for continuation of printing is to be provided according to the table means, the second medium information, and the print setting; and when the continuation of printing is input, the output means outputs print data generated by the generation means.

[Aspect 8]

The data processing apparatus according to any of aspects 1 to 7, wherein: the first timing (step S1203 shown in FIG. 13) is timing generated by a print request from a spooler for spooling intermediate format data generated from application data; and the acquisition means obtains first medium information at a print request from the spooler.

[Aspect 9]

The data processing apparatus according to any of aspects 1 to 8, further comprising completion detection means (for example, a monitor unit 620 shown in FIG. 2) for detecting completion of output of print data based on the intermediate format data, wherein the print request from the spooler is issued based on the detection result from the completion detection means.

[Aspect 10]

The data processing apparatus according to any of aspects 1 to 9, wherein the acquisition means obtains media information in a job unit or a page unit.

[Aspect 11]

The data processing apparatus according to aspects 1 to 10, wherein the output means transmits spooled print data to a communicable printer through a communications line.

[Aspect 12]

The data processing apparatus according to aspects 1 to 11, further comprising record means for following an ink jet system for recording data on a medium.

[Aspect 13]

A print control method for use with a data processing apparatus capable of communicating with a printer having a detection unit for detecting a type of fed paper, comprising: a generating step (step S1206 shown in FIG. 13) of generating print data; an outputting step (step S1207 shown in FIG. 13) of outputting print data generated in the generating step; a detecting step of detecting a mismatch according to first medium information obtained with first timing (step S1203 shown in FIG. 13) when new print data is generated based on the original print data, and second medium information obtained with second timing (step S1304 shown in FIG. 14) before outputting print data generated by the generating step; and a warning controlling step (step S1306 shown in FIG. 14) for issuing a warning based on the detection in the detecting step.

[Aspect 14]

A computer-readable storage medium storing a program for realizing the print control method according to aspect 13.

[Aspect 15]

A program for realizing the data processing apparatus according to any of aspects 1 to 12.

According to the above-mentioned embodiment and aspects, the following effects can be obtained.

(1) Since a mismatch between paper set on a printer when print data is generated and paper set on a printer when print data is transferred can be detected, the print data and the paper cannot be printed with the mismatch, thereby preventing the waste of paper and ink.

(2) Since a warning can be issued without fail when there is a mismatch between the printing mode selected by a user (frameless printing, double-sided printing, etc.) and the paper set on the printer when print data is generated, the print mode and the paper cannot be printed with the mismatch, thereby preventing the waste of paper and ink. Furthermore, the possible damage inside the structure of a printer due to the printing performed with a mismatch between print mode and paper can be prevented.

(3) When there is a mismatch between the printing mode selected by a user (frameless printing, double-sided printing, etc.) and the paper set on the printer when print data is generated, a warning can be issued without fail when the print data is transferred without delaying the print data generating process. Therefore, a warning of the mismatch between the print mode and the paper can be issued without fail and without reducing the process efficient of the entire printing system.

As described above, according to the present invention, relating to an arbitrary type of paper, it is determined a plurality of times with different timing during the process on the print data whether or not there is a mismatch between the type of paper set on a printer and the type of paper set in the print mode. Therefore, although a match is detected before generating print data, and although a mismatch is detected between types of media detected with output timing of print data, the generation and output of print data can be restricted depending on the timing of the occurrence of a problem, and the printing which brings about poor printing results due to the mismatch between a medium as fed paper and a set medium can be suppressed, thereby realizing a useful printing environment.

Furthermore, by predicting a problem occurring from a combination of frameless printing, double-sided printing, and a medium, the printing which brings about a poor printing result of the frameless printing and the double-sided printing due to the mismatch between a medium as a fed paper and a set medium can be suppressed, thereby freely providing a useful printing environment.

As a result, for a user in an environment in which print processing can be performed using plain paper as a default without opening a printer detailed setting property, an appropriate print result can be obtained by generating the optimum print data without forcing the user to perform a complicated operation of setting paper, etc.

This application claims priority from Japanese Patent Application No. 2003-206826 filed Aug. 8, 2003, which is hereby incorporated by reference herein.

What is claimed is:

1. A data processing apparatus comprising:
an acquisition unit constructed to acquire medium information on a medium to determine a paper type, wherein the medium information is obtained from a printer;
a generation unit constructed to generate print data based on the determined paper type, after said acquisition unit acquires the medium information;
a transmission unit constructed to transmit the print data generated by the generation unit to the printer;
a determination unit constructed to determine a mismatch between the print data generated by the generation unit and the medium by comparing a paper type determined based on first medium information acquired by the acquisition unit before the generation unit generates the print data and a paper type determined based on second medium information acquired by the acquisition unit after the generation unit generates the print data; and
a process unit constructed to issue a warning based on the determination by the determination unit,
wherein the acquisition unit acquires the first medium information for a print job from the printer at a first timing before the generation unit generates the print data for the print job, and acquires the second medium information for the same print job again from the printer at a second timing after the generation unit generates the print data for the print job.

2. The data processing apparatus according to claim 1, wherein the acquisition unit acquires the respective first and second media information about the medium, and wherein the acquisition unit is implemented in the printer and comprises a media sensor.

3. The data processing apparatus according to claim 2, wherein the generation unit generates the print data based on plain paper when there is no medium in the printer.

4. The data processing apparatus according to claim 2, further comprising
a recognition unit constructed to recognize a type of paper set on a setting screen,
wherein the acquisition unit acquires the first medium information before the generation unit generates the print data when the type of paper recognized by the recognition unit is a predetermined type or a default type.

5. The data processing apparatus according to claim 1, further comprising a read unit constructed to read a print setting included in the print data generated by the generation unit, wherein the process unit detects a setting mismatch between the print setting read by the read unit and the second medium information acquired by the acquisition unit after the generation unit generates the print data.

6. The data processing apparatus according to claim 1, further comprising a table unit constructed to designate applicability between a type of medium and a print setting, wherein the process unit issues a setting warning based on the table unit, the second medium information acquired after the generation unit generates the print data, and the print setting.

7. The data processing apparatus according to claim 6, wherein the table unit comprises three or more levels of matching relations between the type of medium and the print setting, including levels of correspondence, non-correspondence, and partial correspondence,
> wherein the process unit determines whether or not a continuation choice for continuation of printing is to be provided according to the table unit, the second medium information acquired after the generation unit generates the print data, and the print setting, and
> wherein when the continuation choice for continuation of printing is input, the transmission unit transmits the print data generated by the generation unit.

8. The data processing apparatus according to claim 2, wherein the first medium information is acquired before the generation unit generates the print data according to a timing generated by a print request from a spooler for spooling intermediate format data generated from application data, and wherein the acquisition unit acquires the first medium information before the generation unit generates the print data at the print request from the spooler.

9. The data processing apparatus according to claim 8, further comprising a completion detection unit constructed to detect completion of output of the print data based on the intermediate format data, wherein a subsequent print request from the spooler is issued based on the detection result from the completion detection unit.

10. The data processing apparatus according to claim 2, wherein the acquisition unit acquires the second media information after the generation unit generates the print data in a job unit or a page unit.

11. The data processing apparatus according to claim 1, wherein the transmission unit transmits spooled print data to a communicable printer through a communications line.

12. The data processing apparatus according to claim 1, further comprising a record unit constructed to follow an ink jet system and to record data on a medium.

13. A print control method comprising:
a first acquisition step of acquiring first medium information on a medium to determine a paper type, wherein the first medium information is acquired from a printer;
a generating step of generating print data based on the determined paper type, after said first acquisition step acquires the first medium information;
a transmission step of transmitting the print data generated in the generating step to the printer;
a second acquisition step of acquiring second medium information on the medium to determine a paper type, wherein the second medium information is acquired from the printer, after the generation step generates the print data based on the acquired first medium information;
a determining step of determining a mismatch between the generated print data and the medium by comparing the paper type determined based on the first medium information acquired in the first acquisition step and the paper type determined based on the second medium information acquired in the second acquisition step; and
a processing step of issuing a warning based on the determination in the determining step,
wherein the first acquisition step acquires the first medium information for a print job from the printer at a first timing generates the print data for the print job, and wherein the second acquisition step acquires the second medium information for the same print job again from the printer at a second timing after the generating step generates the print data for the print job.

14. The print control method according to claim 13, wherein the first and second acquisition steps acquire the respective first and second media information about the medium, and wherein an acquisition unit is implemented in the printer and comprises a media sensor.

15. The print control method according to claim 14, wherein the generating step generates the print data based on plain paper when there is no medium in the printer.

16. The print control method according to claim 14, further comprising
a recognizing step of recognizing a type of paper set on a setting screen,
wherein the first acquisition step acquires the first medium information when the type of paper recognized by the recognizing step is a predetermined type or a default type.

17. The print control method according to claim 13, further comprising a reading step of reading a print setting included in the print data generated in the generating step, wherein the processing step detects a setting mismatch between the print setting read in the reading step and the second medium information acquired in the second acquisition step.

18. The print control method according to claim 13, further comprising a table providing step of providing a table designating applicability between a type of medium and a print setting, wherein the processing step issues a setting warning based on the table, the second medium information, and the print setting.

19. The print control method according to claim 18, wherein the table comprises or more three levels of matching relations between the type of medium and the print setting, including levels of correspondence, non-correspondence, and partial correspondence,
> wherein the processing step determines whether or not a continuation choice for continuation of printing is to be provided according to the table, the second medium information, and the print setting, and
> wherein when the continuation choice for continuation of printing is input, the transmission step transmits the print data generated in the generating step.

20. The print control method according to claim 14, wherein the first medium information is acquired according to a timing generated by a print request from a spooler for spooling intermediate format data generated from application data, and wherein the first acquisition step obtains the first medium information at the print request from the spooler.

21. The print control method according to claim 20, further comprising a completion detecting step of detecting a completion of output of the print data based on the intermediate format data, wherein a subsequent print request from the spooler is issued based on the detection result in the completion detecting step.

22. The print control method according to claim 14, wherein the second acquiring step acquires the second media information in a job unit or a page unit.

23. The print control method according to claim 13, wherein the transmission step transmits spooled print data to a communicable printer through a communications line.

24. The print control method according to claim 13, further comprising a recording step of following an ink jet system and recording data on a medium.

25. A computer-readable memory medium retrievably storing a computer-executable program, for realizing a print control method for use with a printer having an acquisition unit for detecting a type of paper, said program comprising:
a first acquisition step of acquiring first medium information on a medium to determine a paper type, wherein the first medium information is acquired from the printer;

a generating step of generating print data based on the determined paper type, after said first acquisition step acquires the first medium information;

a transmission step of transmitting the print data generated in the generating step;

a second acquisition step of acquiring second medium information on the medium to determine a paper type, wherein the second medium information is acquired from the printer, after the generation step generates the print data based on the acquired first medium information;

a determining step of determining a mismatch between the generated print data and the medium by comparing the paper type determined based on the first medium information acquired in the first acquisition step and the second medium information acquired in the second acquisition step; and a processing step of issuing a warning based on the determination in the determining step, wherein the first acquisition step acquires the first medium information for a print job from the printer at a first timing generates the print data for the print job, and wherein the second acquisition step acquires the second medium information for the same print job again from the printer at a second timing after the generating step generates the print data for the print job.

\* \* \* \* \*